US012734476B2

(12) United States Patent
Noda

(10) Patent No.: US 12,734,476 B2
(45) Date of Patent: Sep. 15, 2026

(54) GAS SEPARATION SYSTEM AND GAS SEPARATION METHOD

(71) Applicant: NGK INSULATORS, LTD., Nagoya-City (JP)

(72) Inventor: Kenichi Noda, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 336 days.

(21) Appl. No.: 18/599,433

(22) Filed: Mar. 8, 2024

(65) Prior Publication Data

US 2024/0207779 A1 Jun. 27, 2024

Related U.S. Application Data

(63) Continuation of application No. PCT/JP2022/031875, filed on Aug. 24, 2022.

(30) Foreign Application Priority Data

Sep. 30, 2021 (JP) ................................ 2021-160292

(51) Int. Cl.
*B01D 53/02* (2006.01)
*B01D 53/22* (2006.01)

(52) U.S. Cl.
CPC ........ *B01D 53/229* (2013.01); *B01D 2256/22* (2013.01)

(58) Field of Classification Search
CPC .......... B01D 2256/22; B01D 2257/504; B01D 53/047; B01D 53/0476; B01D 53/229; B01D 53/62; B01D 53/82; Y02C 20/40
See application file for complete search history.

(56) References Cited

U.S. PATENT DOCUMENTS 4,765,804 A 8/1988 Lloyd-Williams et al.
2004/0216609 A1 11/2004 Baksh et al.
(Continued)

FOREIGN PATENT DOCUMENTS

DE 20 2019 001 415 U1 5/2019
JP S61-230715 A 10/1986
(Continued)

OTHER PUBLICATIONS

English translation of the International Preliminary Report on Patentability (Chapter I) dated Apr. 11, 2024 (Application No. PCT/JP2022/031875).

(Continued)

*Primary Examiner* — Christopher P Jones
(74) *Attorney, Agent, or Firm* — Muncy, Geissler, Olds & Lowe, P.C.

(57) ABSTRACT

A gas separation system includes an adsorption apparatus and a separation membrane apparatus. A mixed gas including a target gas is introduced into the adsorption apparatus. A replacement gas is further introduced into the adsorption apparatus, and at least part of the gas exhausted from the adsorption apparatus at this time is introduced into a space on the non-permeate side of the separation membrane apparatus to obtain a first enriched gas enriched with the target gas by the separation membrane. Meanwhile, after the introduction of the replacement gas, the gas is exhausted from the adsorption apparatus while causing an adsorbent to desorb or dissipate the target gas so as to obtain a second enriched gas enriched with the target gas.

15 Claims, 13 Drawing Sheets

(56) References Cited

U.S. PATENT DOCUMENTS

| | | | | |
|---|---|---|---|---|
| 2004/0250472 | A1* | 12/2004 | Okada | B01D 53/047 48/128 |
| 2010/0129284 | A1 | 5/2010 | Niitsuma et al. | |
| 2013/0101352 | A1* | 4/2013 | Vianello | E21B 43/40 405/59 |
| 2014/0144321 | A1 | 5/2014 | Sawamura et al. | |
| 2020/0016536 | A1* | 1/2020 | Aoshima | B01D 53/025 |
| 2021/0339189 | A1 | 11/2021 | Winkler | |
| 2022/0235478 | A1 | 7/2022 | Peschel et al. | |

FOREIGN PATENT DOCUMENTS

| | | | |
|---|---|---|---|
| JP | S63-065930 | A | 3/1988 |
| JP | S63-091119 | A | 4/1988 |
| JP | H11-019449 | A | 1/1999 |
| JP | 2004-536702 | A | 12/2004 |
| JP | 2008-247632 | A | 10/2008 |
| JP | 2008-247636 | A | 10/2008 |
| JP | 2012-236134 | A | 12/2012 |
| JP | 2015-124135 | A | 7/2015 |
| JP | 2021-049482 | A | 4/2021 |
| WO | WO 2021/073769 | A1 | 4/2021 |

OTHER PUBLICATIONS

International Search Report and Written Opinion (Application No. PCT/JP2022/031875) dated Nov. 1, 2022 (9 pages).

German Office Action for German Application No. 11 2022 003 960.4 dated Apr. 16, 2026.

* cited by examiner

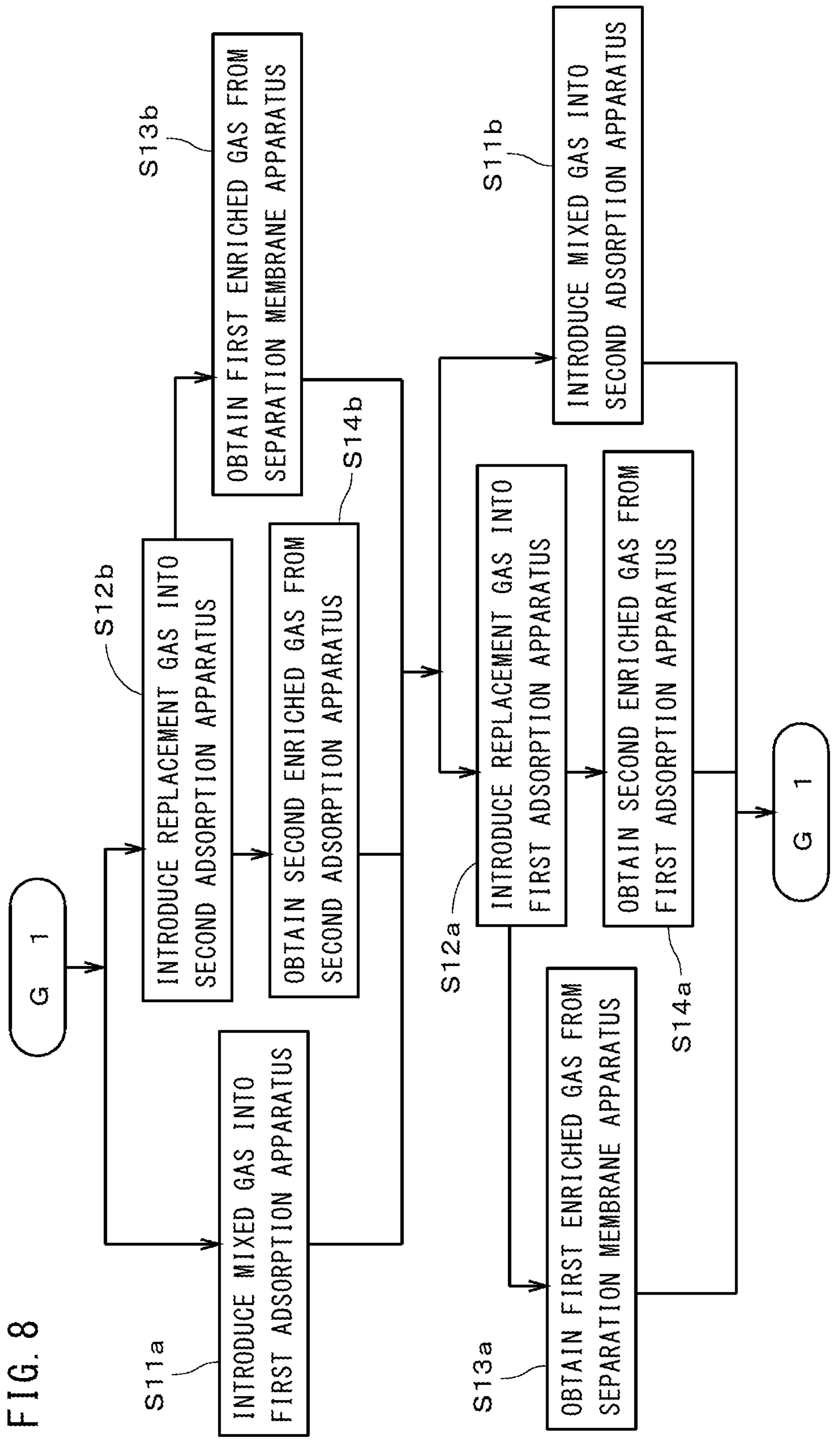
FIG. 8
G1
S11a
INTRODUCE MIXED GAS INTO FIRST ADSORPTION APPARATUS
S12b
INTRODUCE REPLACEMENT GAS INTO SECOND ADSORPTION APPARATUS
S14b
OBTAIN SECOND ENRICHED GAS FROM SECOND ADSORPTION APPARATUS
S13b
OBTAIN FIRST ENRICHED GAS FROM SEPARATION MEMBRANE APPARATUS
S13a
OBTAIN FIRST ENRICHED GAS FROM SEPARATION MEMBRANE APPARATUS
S12a
INTRODUCE REPLACEMENT GAS INTO FIRST ADSORPTION APPARATUS
S14a
OBTAIN SECOND ENRICHED GAS FROM FIRST ADSORPTION APPARATUS
S11b
INTRODUCE MIXED GAS INTO SECOND ADSORPTION APPARATUS
G1

GAS SEPARATION SYSTEM AND GAS SEPARATION METHOD

CROSS-REFERENCE TO RELATED APPLICATIONS

The present application is a continuation application of International Application No. PCT/JP2022/31875 filed on Aug. 24, 2022, which claims priority to Japanese Patent Application No. 2021-160292 filed in the Japan Patent Office on Sep. 30, 2021. The contents of these applications are incorporated herein by reference in their entirety.

TECHNICAL FIELD

The present invention relates to a technique for obtaining a gas enriched with a target gas from a mixed gas.

BACKGROUND ART

Proposals for combining a pressure swing adsorption (PSA) apparatus and a separation membrane apparatus together in order to obtain a desired gas from a mixed gas have conventionally been made as exemplified in Japanese Patent Applications Laid-Open No. S61-230715 (Document 1), No. 2008-247632 (Document 2), No. 2008-247636 (Document 3), No. 2012-236134 (Document 4), and No. 2021-49482 (Document 5). According to Document 1, after a converter exhaust gas containing CO, $CO_2$, $H_2O$, $N_2$, $H_2$, and $O_2$ is introduced into an adsorption apparatus and $H_2O$, $CO_2$, and CO are adsorbed by an adsorbent and separated from the exhaust gas, $CO_2$ and $H_2O$ are separated from a mixed gas of $H_2O$, $CO_2$, and CO by permeation through a separation membrane. The permeated gas is used as a cleaning gas in the adsorption apparatus in order to purge a residual gas after completion of the adsorption process.

According to Documents 2 and 3, an adsorbent in the PSA apparatus adsorbs components other than $H_2$ in a gas containing $H_2$, $CO_2$ and so on to extract a first hydrogen-enriched gas as product hydrogen. The PSA off-gas is sent in order from a hydrogen separation membrane to a $CO_2$ separation membrane or from the $CO_2$ separation membrane to the hydrogen separation membrane, and a second hydrogen-enriched gas obtained through the hydrogen separation membrane is recycled to the PSA apparatus.

According to Document 4, a permeate gas having a $CO_2$ concentration of 80% or higher is obtained from a mixed gas containing $CO_2$ through a $CO_2$ separation membrane, and thereafter a $CO_2$-condensed gas having a $CO_2$ concentration of 80% or higher is acquired from a retentate gas via the PSA apparatus.

According to Document 5, a purified gas is obtained by adsorbing and removing impurities from a source gas containing at least CO and $H_2$ via a thermal swing adsorption apparatus or via the pressure swing adsorption apparatus and the thermal swing adsorption apparatus and separating part of $H_2$ via a hydrogen separation apparatus. The separated $H_2$ is used as a purge gas in the thermal swing adsorption apparatus or in the pressure swing adsorption apparatus and the thermal swing adsorption apparatus.

Meanwhile, in the case where a target gas to be collected is a type of gas that is adsorbed or absorbed by an adsorbent in a pressure swing adsorption apparatus, conventionally the efficiency of collecting gas is improved by introducing a high-concentration gas of the adsorbed gas into the pressure swing adsorption apparatus after adsorption. However, there exists a certain amount of gas that cannot be collected, and therefore a technique for more efficiently collecting gas is sought.

SUMMARY OF THE INVENTION

The present invention is intended for a gas separation system for obtaining a gas enriched with a target gas from a mixed gas including the target gas.

A first aspect of the present invention is a gas separation system for obtaining a gas enriched with a target gas from a mixed gas including the target gas. The gas separation system includes an adsorption apparatus that includes an adsorbent in an internal space, the adsorbent adsorbing or absorbing a target gas, a separation membrane apparatus that includes a separation membrane that permeates the target gas, the separation membrane apparatus flowing the target gas out of a gas introduced into a space on a non-permeate side of the separation membrane to a space on a permeate side of the separation membrane, a mixed-gas feeder that introduces a mixed gas into the adsorption apparatus, the mixed gas including the target gas, a replacement-gas feeder that introduces a replacement gas into the adsorption apparatus, the replacement gas having a higher concentration of the target gas than the mixed gas, a gas exhauster that exhausts a gas in the adsorption apparatus, a communication passage that includes a passage for guiding a gas in the adsorption apparatus to the space on the non-permeate side of the separation membrane, the communication passage further including a valve placed in the passage, and a controller.

The controller controls the mixed-gas feeder, the replacement-gas feeder, the gas exhauster, and the valve to execute a) introducing the mixed gas into the adsorption apparatus, causing the adsorbent to adsorb or absorb the target gas, and exhausting a gas that is not adsorbed or absorbed by the adsorbent from the adsorption apparatus, b) after the operation a), introducing the replacement gas into the adsorption apparatus, c) introducing at least part of the gas exhausted from the adsorption apparatus in the operation b) into the space on the non-permeate side of the separation membrane and obtaining a gas enriched more with the target gas than the mixed gas by the separation membrane from a gas in the space on the non-permeate side, and d) after the operation b), obtaining a gas enriched more with the target gas than the mixed gas by exhausting a gas from the adsorption apparatus while causing the adsorbent to desorb or dissipate the target gas.

The gas separation system according to the present invention is capable of efficiently obtaining the target gas.

A second aspect of the present invention is the gas separation system according to the first aspect, in which in the operation c), an initial volume of the gas exhausted from the adsorption apparatus is not introduced into the space on the non-permeate side of the separation membrane, or when the initial volume of the gas exhausted from the adsorption apparatus is introduced into the space on the non-permeate side, gas separation by the separation membrane is not executed.

A third aspect of the present invention is the gas separation system according to the first or second aspect that further includes a passage for guiding a gas in the space on the non-permeate side of the separation membrane to the mixed-gas feeder for use as part of the mixed gas.

A fourth aspect of the present invention is the gas separation system according to the first or second aspect (or any one of the first to third aspects) that further includes another adsorption apparatus similar to the adsorption apparatus. The communication passage includes a passage for guiding a gas in the another adsorption apparatus to the space on the non-permeate side of the separation membrane, the communication passage further including another valve placed in the passage.

The controller controls the mixed-gas feeder, the replacement-gas feeder, the gas exhauster, the valve, and the another valve to execute e) introducing the mixed gas into the another adsorption apparatus, f) after the operation e), introducing the replacement gas into the another adsorption apparatus, g) introducing at least part of a gas exhausted from the another adsorption apparatus in the operation f) into the space on the non-permeate side of the separation membrane and obtaining a gas enriched more with the target gas than the mixed gas by the separation membrane from a gas in the space on the non-permeate side, and h) after the operation f), obtaining a gas enriched more with the target gas than the mixed gas by exhausting a gas from the another adsorption apparatus while causing an adsorbent in the another adsorption apparatus to desorb or dissipate the target gas. Here, the operations f) to h) are executed during execution of the operation a), and the operations b) to d) are executed during execution of the operation e).

A fifth aspect of the present invention is the gas separation system according to the first or second aspect (or any one of the first to fourth aspects), in which the target gas is a carbon dioxide gas.

A sixth aspect of the present invention is the gas separation system according to the first or second aspect (or any one of the first to fifth aspects), in which the replacement gas has a concentration of the target gas higher than or equal to 98%.

The present invention is also intended for a gas separation method of obtaining a gas enriched with a target gas from a mixed gas including the target gas.

A seventh aspect of the present invention is a gas separation method of obtaining a gas enriched with a target gas from a mixed gas including the target gas. The gas separation method includes a) introducing a mixed gas including a target gas into an adsorption apparatus that includes an adsorbent in an internal space, causing the adsorbent to adsorb or absorb the target gas, and exhausting a gas that is not adsorbed or absorbed by the adsorbent from the adsorption apparatus, b) after the operation a), introducing a replacement gas into the adsorption apparatus, the replacement gas having a higher concentration of the target gas than the mixed gas, c) introducing at least part of the gas exhausted from the adsorption apparatus in the operation b) into a space on a non-permeate side of a separation membrane apparatus that includes a separation membrane that permeates the target gas, and obtaining a gas enriched more with the target gas than the mixed gas by the separation membrane from a gas in the space on the non-permeate side, and d) after the operation b), obtaining a gas enriched more with the target gas than the mixed gas by exhausting a gas from the adsorption apparatus while causing the adsorbent to desorb or dissipate the target gas.

The gas separation method according to the present invention enables efficiently obtaining the target gas.

An eighth aspect of the present invention is the gas separation method according to the seventh aspect, in which in the operation c), an initial volume of the gas exhausted from the adsorption apparatus is not introduced into the space on the non-permeate side of the separation membrane, or when the initial volume of the gas exhausted from the adsorption apparatus is introduced into the space on the non-permeate side, gas separation by the separation membrane is not executed.

A ninth aspect of the present invention is gas separation method according to the seventh or eighth aspect, in which an average concentration of the target gas in the gas introduced into the separation membrane apparatus in the operation c) is higher than a concentration of the target gas in the mixed gas.

A tenth aspect of the present invention is the gas separation method according to the seventh or eighth aspect (or any one of the seventh to ninth aspects), in which the gas obtained in the space on the non-permeate side of the separation membrane in the operation c) is used as part of the mixed gas.

An eleventh aspect of the present invention is the gas separation method according to the seventh or eighth aspect (or any one of the seventh to tenth aspects) that further includes e) introducing the mixed gas into another adsorption apparatus that is similar to the adsorption apparatus, f) after the operation e), introducing the replacement gas into the another adsorption apparatus, g) introducing at least part of a gas exhausted from the another adsorption apparatus in the operation f) into the space on the non-permeate side of the separation membrane apparatus and obtaining a gas enriched more with the target gas than the mixed gas by the separation membrane from the gas in the space on the non-permeate side, and h) after the operation f), obtaining a gas enriched more with the target gas than the mixed gas by exhausting a gas from the another adsorption apparatus while causing an adsorbent in the another adsorption apparatus to desorb or dissipate the target gas. Here, the operations f) to h) are executed during execution of the operation a), and the operations b) to d) are executed during execution of the operation e).

A twelfth aspect of the present invention is the gas separation method according to the seventh or eighth aspect (or any one of the seventh to eleventh aspects), in which the target gas is a carbon dioxide gas.

A thirteenth aspect of the present invention is the gas separation method according to the seventh or eighth aspect (or any one of the seventh to twelfth aspects), in which the replacement gas has a concentration of the target gas higher than or equal to 98%.

A fourteenth aspect of the present invention is the gas separation method according to the seventh or eighth aspect (or any one of the seventh to thirteenth aspects) that further includes mixing the gas enriched with the target gas in the operation c) with the gas enriched with the target gas in the operation d).

A fifteenth aspect of the present invention is the seventh or eighth aspect (or any one of the seventh to fourteenth aspects), in which the replacement gas in the operation b) is either the gas enriched with the target gas in the operation c) or the gas enriched with the target gas in the operation d).

These and other objects, features, aspects and advantages of the present invention will become more apparent from the following detailed description of the present invention when taken in conjunction with the accompanying drawings.

BRIEF DESCRIPTION OF DRAWINGS

FIG. 8 is a flowchart of operations of the gas separation system.

DETAILED DESCRIPTION

Figure 1:
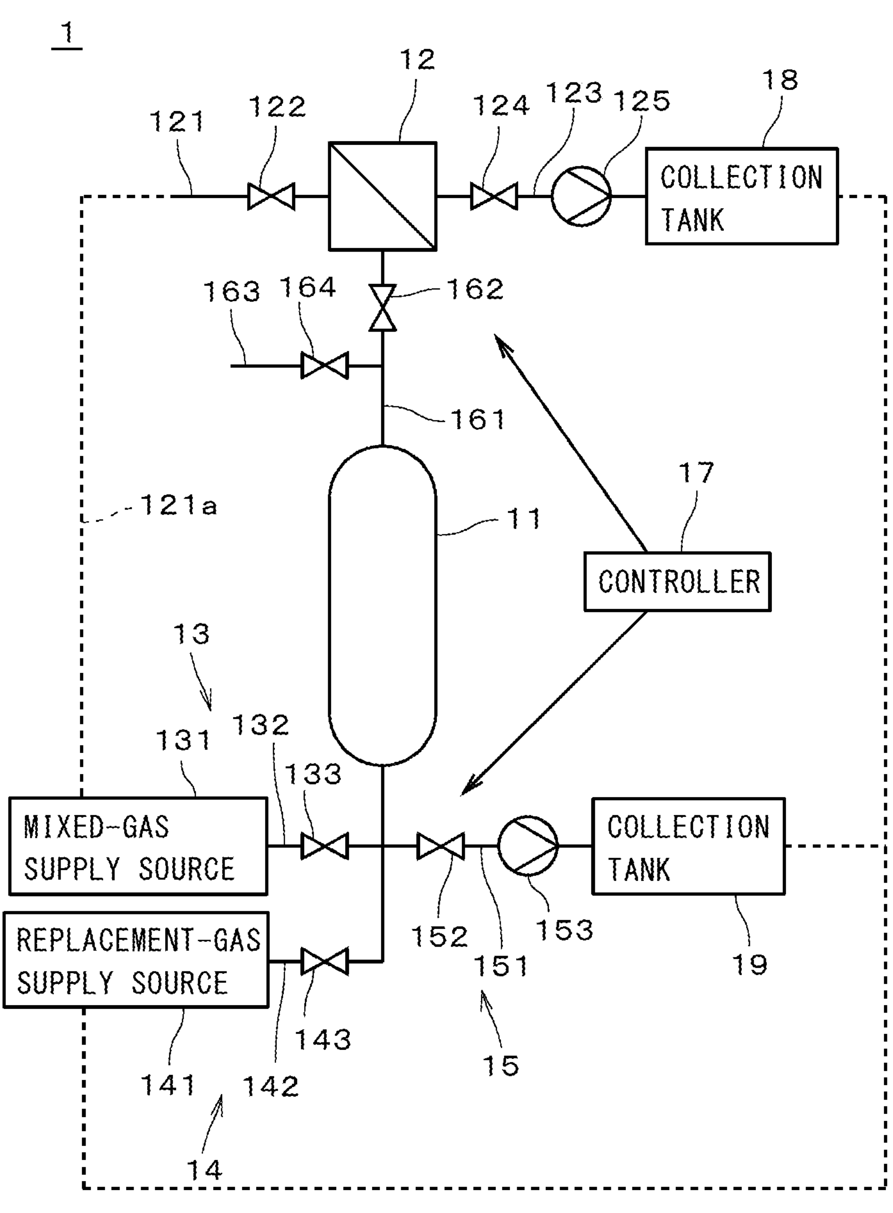
FIG. 1 is a diagram showing a configuration of a gas separation system.

FIG. 1 is a diagram showing a configuration of a gas separation system 1 according to one embodiment of the present invention. The gas separation system 1 obtains a gas enriched with a target gas from a mixed gas including the target gas. That is, the target gas is a gas to be collected from the mixed gas. The term "target gas" refers to a specific type of gas and corresponds to one or a plurality of components contained in the mixed gas. The term "mixed gas" refers to a gas in which a plurality of types of gas are mixed and is a gas to be supplied to the gas separation system 1. In the present embodiment, the target gas may, for example, be a carbon dioxide gas (hereinafter, simply referred to as "$CO_2$"). In the present embodiment, the mixed gas may, for example, be an exhaust gas exhausted from a facility such as a power generating plant, a garbage incinerator, an iron works, or a cement factory.

The gas separation system 1 includes an adsorption apparatus 11, a separation membrane apparatus 12, a mixed-gas feeder 13, a replacement-gas feeder 14, a gas exhauster 15, a communication passage 161, and a controller 17. Examples of the adsorption apparatus 11 according to the present invention include a pressure swing adsorption (PSA) apparatus, a thermal swing adsorption (TSA) apparatus, a pressure and thermal swing adsorption (PTSA) apparatus, and a solid absorption apparatus (an apparatus using a solid absorbent). For example, the adsorption apparatus 11 may include an adsorbent in an internal space of an approximately cylindrical container called an "adsorption tower." The adsorbent according to the present invention may be a solid material that selectively adsorbs or absorbs the target gas. Preferably, the adsorbent to be used may be the one that adsorbs or absorbs only the target gas or a largest amount of the target gas. The adsorbent may also simultaneously adsorb or absorb different types of gas other than the target gas. As the adsorbent, any of various known adsorbents may be used, and examples of the adsorbent to be used include zeolite, carbon molecular sieve, activated carbon, activated alumina, silica gel, silica alumina, a metal-organic framework (MOF), and solid amine. As another alternative, a porous body (e.g., porous silica, porous alumina, or porous titania) that supports a substance for absorbing the target gas (so-called "solid absorbent") may be used as the adsorbent. Or, the adsorbent may be one or more materials selected from the aforementioned materials. In the case where the target gas is $CO_2$, the adsorbent to be used may, for example, be an X-type zeolite, a carbon molecular sieve, or a solid absorbent supporting amine or the like. Note that the adsorbent is a solid material and this definition does not include a liquid material such as an amine solution. The present embodiment describes a case in which the adsorption apparatus 11 is a PSA apparatus.

The separation membrane apparatus 12 includes a separation membrane that selectively permeates the target gas. The separation membrane apparatus 12 includes a housing (container) that stores the separation membrane and whose interior is partitioned by the separation membrane into a space on the non-permeate side into which a gas before separation is introduced and a space on the permeate side on which a separated gas exists. The separation membrane apparatus 12 may include a plurality of separation membranes or a plurality of housings. In the separation membrane apparatus 12, out of the gas introduced into the space on the non-permeate side of the separation membrane, the target gas flows to the space on the permeate side of the separation membrane. Preferably, a membrane that permeates only the target gas or permeates a largest amount of the target gas may be used as the separation membrane. The separation membrane may also permeate a different type of gas other than the target gas at the same time. As the separation membrane, any of various known separation membranes may be used, and for example, a zeolite membrane, a carbon membrane, a silica membrane, a polymer membrane, or a facilitated transport membrane may be used. As a preferable example, the separation membrane may be a zeolite membrane formed on a porous support. In the case where the target gas is $CO_2$, for example, a Y-type, DDR-type, or CHA-type zeolite membrane may be used as the separation membrane.

The gas introduced into the separation membrane apparatus 12 is introduced into the space on the non-permeate side, and a gas that can permeate through the separation membrane flows to the space on the permeate side. In the example shown in FIG. 1, the space on the non-permeate side of the separation membrane apparatus 12 is connected to an exhaust passage 121, and an exhaust valve 122 is placed in the exhaust passage 121. The space on the non-permeate side is connected to a communication passage 161 for introducing gas. The space on the permeate side is connected to a collection path 123, and a collection valve 124 and a pressure-reducing pump 125 are placed in the collection path 123. The collection path 123 is connected to a collection tank 18. The exhaust valve 122 and the collection valve 124 are on-off valves.

In the present embodiment, the housing that houses the separation membrane is described as the separation membrane apparatus 12, but the exhaust passage 121, the exhaust valve 122, the collection path 123, the collection valve 124, and the pressure-reducing pump 125 that are relevant to gas separation may be regarded as part of the separation membrane apparatus 12. In relation to the separation membrane apparatus 12, other components such as valves (which are not limited to on-off valves and may be pressure-regulating valves (e.g., back-pressure valves; the same applies below) or any other type of valves), pressure-reducing pumps, compressors, or passages may be disposed in various places. For example, a blower or a pressure-reducing pump may be placed in the exhaust passage 121.

The mixed-gas feeder 13 introduces a mixed gas into the adsorption apparatus 11. The mixed-gas feeder 13 includes a mixed-gas supply source 131, a feed passage 132, and a feed valve 133 placed in the feed passage 132. The feed valve 133 is an on-off valve. The mixed-gas supply source 131 is generally a tank for storing a mixed gas and may be connected to a blower or a pump for delivery of gas. Piping for guiding the mixed gas to the feed passage 132 may be regarded as the mixed-gas supply source 131. Or, the emission source of the mixed gas may be the mixed-gas supply source 131. The feed passage 132 connects the mixed-gas supply source 131 and the adsorption apparatus 11. A part of the feed passage 132 in the vicinity of the adsorption apparatus 11 is shared by other passages. The mixed-gas feeder 13 shown in FIG. 1 is illustrative only, and any other components such as valves (which are not limited to on-off valves and may be pressure-regulating valves or any other type of valves), pressure-reducing pumps, compressors, or passages may be disposed in various places. Moreover, other apparatuses such as a dehydrator may be placed between the mixed-gas supply source 131 and the adsorption apparatus 11.

The concentration of the target gas in the mixed gas may be preferably higher than or equal to 1% and lower than or equal to 30% and more preferably higher than or equal to 2% and lower than or equal to 20%. In the case where the target gas is $CO_2$, the concentration of the target gas in the mixed gas may preferably be higher than or equal to 3% and lower than or equal to 30%.

The replacement-gas feeder 14 introduces a replacement gas into the adsorption apparatus 11. The term "replacement gas" refers to a gas that is supplied to the adsorption apparatus 11 to replace the gas inside the adsorption apparatus 11. The replacement gas is a gas that has a higher concentration of the target gas than the mixed gas. The concentration of the target gas in the replacement gas may be preferably higher than or equal to 95% and lower than or equal to 100% and more preferably higher than or equal to 98% and lower than or equal to 100%.

The replacement-gas feeder 14 includes a replacement-gas supply source 141, a feed passage 142, and a feed valve 143 placed in the feed passage 142. The feed valve 143 is an on-off valve. The replacement-gas supply source 141 is generally a tank for storing the replacement gas and may be connected to a blower or a pump for delivery of gas. Piping for guiding the replacement gas to the feed passage 142 may be regarded as the replacement-gas supply source 141. Or, the emission source of the replacement gas may be the replacement-gas supply source 141. The feed passage 142 connects the replacement-gas supply source 141 and the adsorption apparatus 11. A part of the feed passage 142 in the vicinity of the adsorption apparatus 11 is shared by other passages. The replacement-gas feeder 14 shown in FIG. 1 is illustrative only, and other components such as valves (which are not limited to on-off valves and may be pressure-regulating valves or any other type of valves), pressure-reducing pumps, compressors, or passages may be disposed in various places.

The gas exhauster 15 exhausts a gas inside the adsorption apparatus 11. The gas exhauster 15 includes an exhaust passage 151, an exhaust valve 152 placed in the exhaust passage 151, and a pressure-reducing pump 153 placed in the exhaust passage 151. The exhaust passage 151 connects the adsorption apparatus 11 and the collection tank 19. The exhaust valve 152 is an on-off valve. The gas exhauster 15 exhausts a gas from the internal space of the adsorption apparatus 11, so that the gas become desorbed or dissipated from the adsorbent and stored in the collection tank 19. The gas exhauster 15 is illustrative only, and other components such as valves (which are not limited to on-off valves and may be pressure-regulating valves or any other type of valves), pressure-reducing pumps, compressors, passages may be disposed in various places.

The communication passage 161 connects the adsorption apparatus 11 and the separation membrane apparatus 12. The communication passage 161 guides the gas inside the adsorption apparatus 11 into the space on the non-permeate side of the separation membrane. A communication valve 162 is placed in the communication passage 161. The communication valve 162 is an on-off valve. The communication passage 161 is connected to an exhaust passage 163 between the adsorption apparatus 11 and the communication valve 162. An exhaust valve 164 is placed in the exhaust passage 163. The exhaust valve 164 is an on-off valve.

The controller 17 controls the aforementioned constituent elements. That is, the controller 17 controls the valves, the pressure-reducing pumps, and any of other various supply sources, and so on included in the aforementioned constituent elements. In particular, the controller 17 controls the mixed-gas feeder 13, the replacement-gas feeder 14, the gas exhauster 15, and the communication valve 162. The controller 17 further controls, for example, peripheral components (including those not shown) of the adsorption apparatus 11 and the separation membrane apparatus 12, and the exhaust valve 164.

Figure 2:
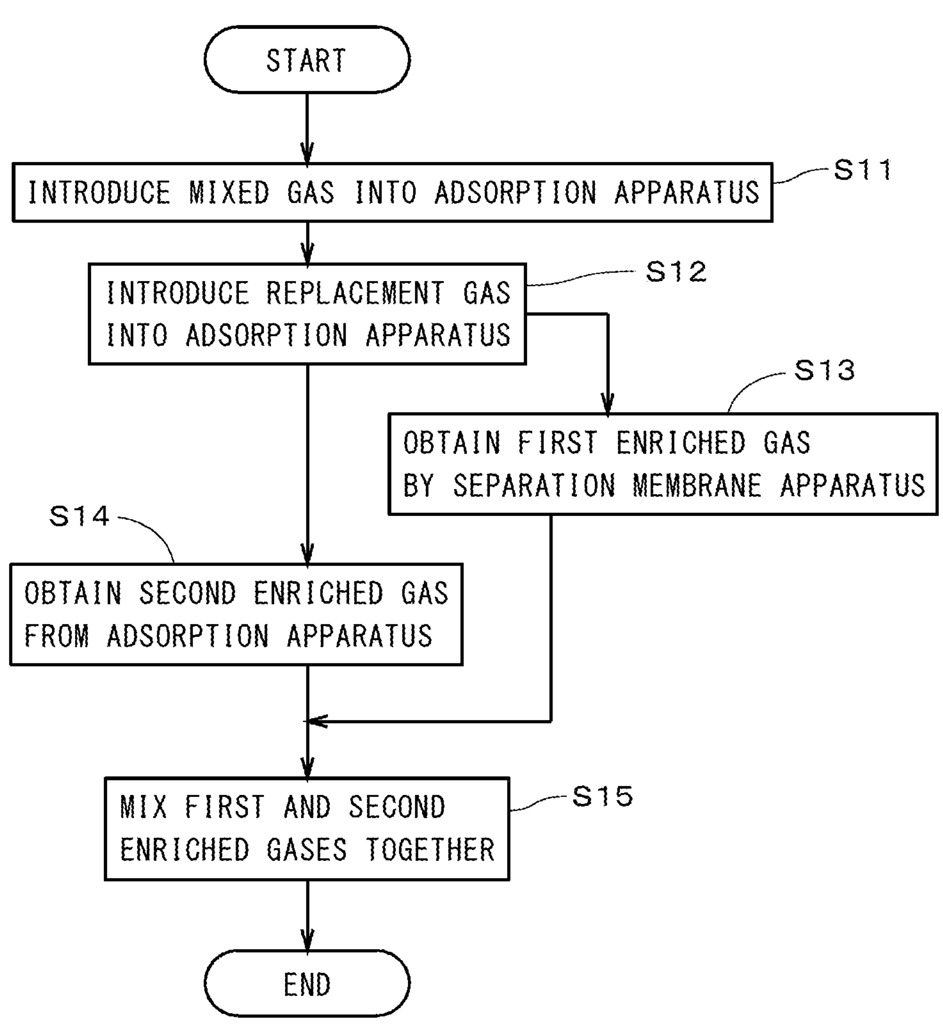
FIG. 2 is a flowchart of operations of the gas separation system.
Figure 3:
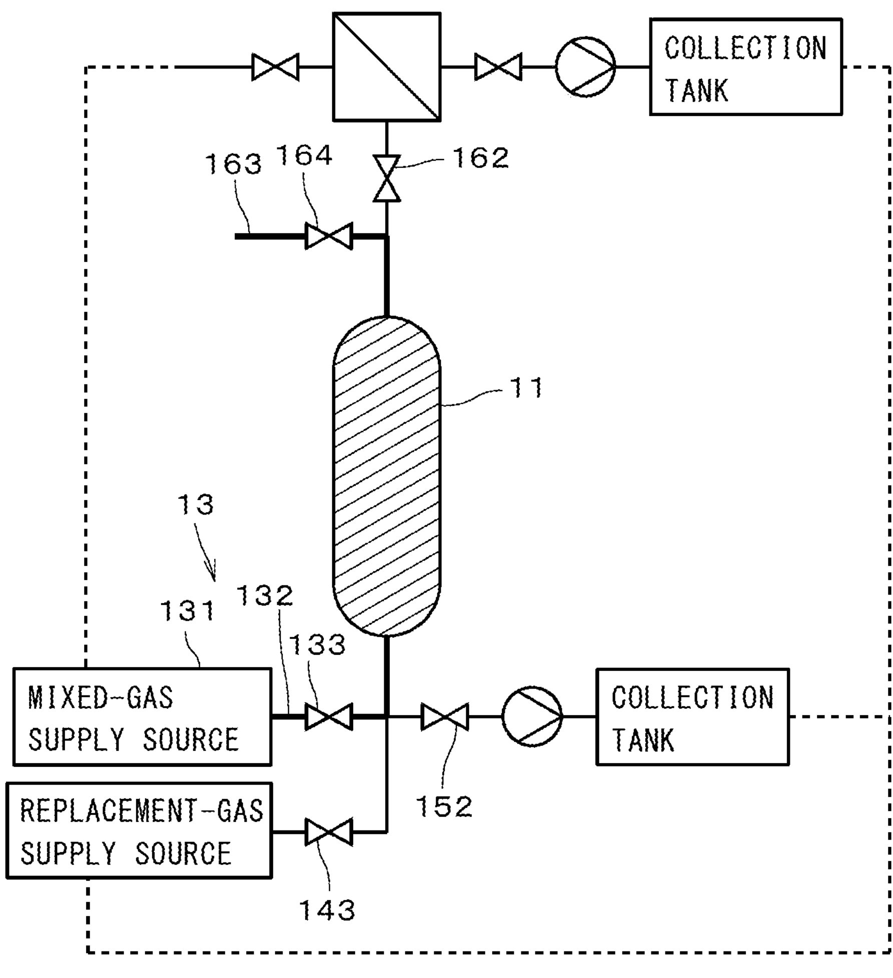
FIG. 3 is a diagram for describing the operations of the gas separation system.
Figure 4:
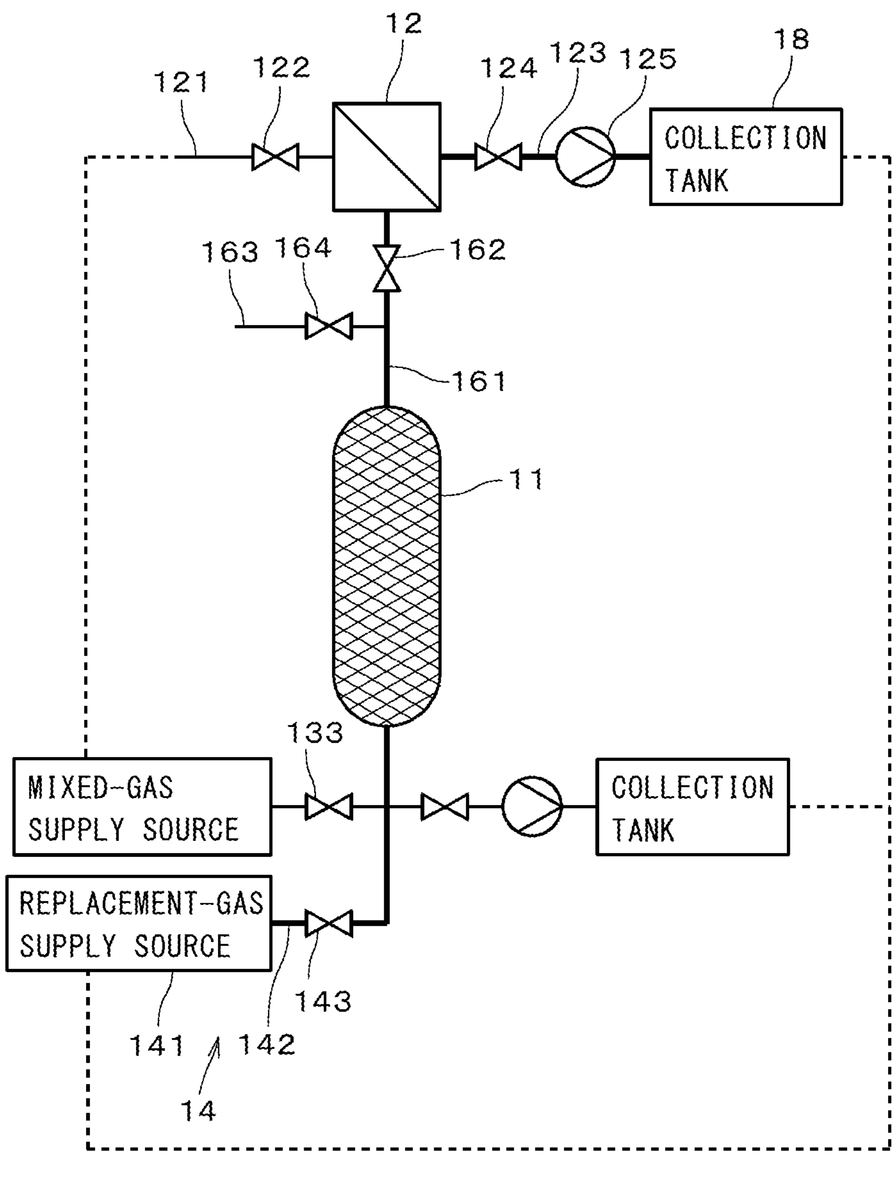
FIG. 4 is a diagram for describing the operations of the gas separation system.
Figure 5:
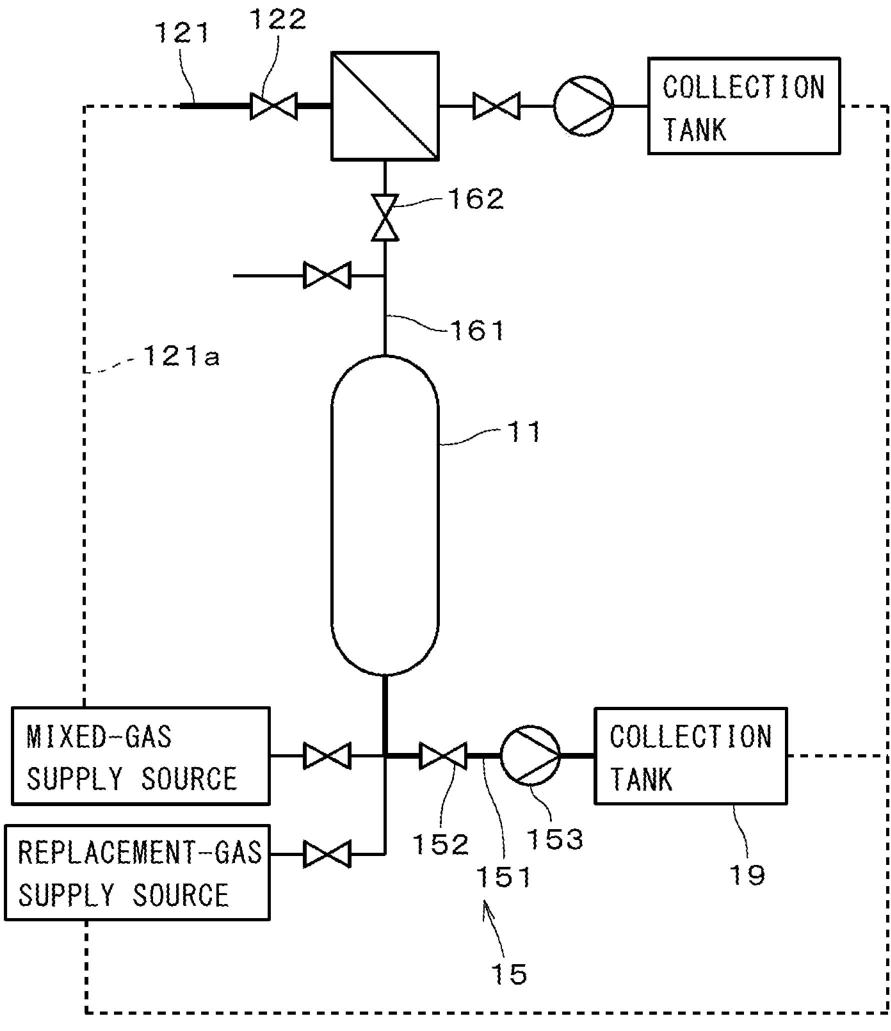
FIG. 5 is a diagram for describing the operations of the gas separation system.

The following description is given of operations of the gas separation system 1 performed under the control of the controller 17. FIG. 2 is a flowchart of the operations of the gas separation system 1. FIGS. 3 to 5 are diagrams for describing the operations of the gas separation system 1.

First, the mixed-gas feeder 13 introduces a mixed gas into the adsorption apparatus 11 as shown in FIG. 3 (step S11). Specifically, in a state in which the pressure in the adsorption apparatus 11 is reduced in advance and the valves 133, 143, 152, 162, and 164 around the adsorption apparatus 11 are closed, the feed valve 133 is opened to introduce the mixed gas from the mixed-gas supply source 131 through the feed passage 132 into the adsorption apparatus 11. Furthermore, when the pressure in the adsorption apparatus 11 becomes higher than or equal to atmospheric pressure, the exhaust valve 164 is opened, so that the mixed gas is further introduced from the mixed-gas supply source 131 into the adsorption apparatus 11. Accordingly, the target gas is adsorbed or absorbed by the adsorbent, and a gas that is not adsorbed or absorbed by the adsorbent is exhausted out of the adsorption apparatus 11 through the exhaust passage 163. Note that the gas to be exhausted does not have to be all of the gas that is not adsorbed or absorbed by the adsorbent. The gas exhausted from the adsorption apparatus 11 before breakthrough of the adsorbent, i.e., before the adsorbent can no longer adsorb or absorb the target gas, is a low-concentration gas having a low concentration of the target gas. The exhaust gas may be collected for use in other applications. Before breakthrough of the adsorbent in the adsorption apparatus 11, the feed valve 133 is closed to stop the supply of the mixed gas to the adsorption apparatus 11.

After step S11, the replacement-gas feeder 14 introduces a replacement gas into the adsorption apparatus 11 as shown in FIG. 4 (step S12). Specifically, the valves 133 and 164 are closed, the feed valve 143 is opened, and the communication valve 162 is opened so that the replacement gas is introduced from the replacement-gas supply source 141 through the feed passage 142 into the adsorption apparatus 11. Accordingly, the interstices of the adsorbent are filled with the replacement gas. At this time, the pressure in the adsorption apparatus 11 is maintained to be higher than or equal to atmospheric pressure in order to inhibit desorption or dissipation of the target gas from the adsorbent.

In step S12, part of the mixed gas and the replacement gas contained in the interstices of the adsorbent is introduced through the communication passage 161 into the space on the non-permeate side of the separation membrane apparatus 12. The gas in the initial stage of step S12 may be exhausted through the exhaust passage 163 or the exhaust passage 121 because this is the mixed gas from which the target gas has been removed. That is, at least part of the gas exhausted from the adsorption apparatus 11 is introduced into the space on the non-permeate side of the separation membrane. In the case where the interior of the separation membrane apparatus 12 is in a pressure-reduced state, the exhaust valve 122 may remain closed.

Specifically, an initial volume of the gas exhausted from the adsorption apparatus 11 is exhausted through the exhaust passage 163 and is not introduced into the space on the non-permeate side of the separation membrane. Alternatively, when the initial volume of the gas exhausted from the adsorption apparatus 11 is introduced into the space on the non-permeate side, the collection valve 124 may be closed so as to prevent the gas from being separated by the separation membrane. This allows the separation membrane to efficiently separate the target gas from the gas exhausted from the adsorption apparatus 11 during the gas replacement in the adsorption apparatus 11. Preferably, an average concentration of the target gas in the gas introduced into the separation membrane apparatus 12 is higher than the concentration of the target gas in the mixed gas. This further improves the efficiency of obtaining the target gas by the separation membrane.

When the separation membrane apparatus 12 separates the gas, the valves 164 and 122 are closed, the collection valve 124 is opened, and the pressure-reducing pump 125 is driven, so that the gas enriched more with the target gas than the mixed gas by the separation membrane (hereinafter, referred to as the "first enriched gas") is obtained from the gas in the space on the non-permeate side (step S13). The first enriched gas is stored in the collection tank 18. The concentration of the target gas in the first enriched gas may preferably be higher than or equal to 90% and lower than or equal to 100% and more preferably higher than or equal to 98% and lower than or equal to 100%. Note that the separation membrane apparatus 12 may separate the gas while keeping the valves 164 and 122 open and introducing the replacement gas into the adsorption apparatus 11.

Thereafter, as shown in FIG. 5, the feed valve 143 and the communication valve 162 are closed, the exhaust valve 152 is opened, and the pressure-reducing pump 153 is driven. That is, the gas exhauster 15 exhausts the gas from the adsorption apparatus 11 while desorbing or dissipating the target gas from the adsorbent. Accordingly, a gas enriched more with the target gas than the mixed gas (hereinafter, referred to as a "second enriched gas") is obtained (step S14). The second enriched gas is stored in the collection tank 19 through the exhaust passage 151. The concentration of the target gas in the second enriched gas may be preferably higher than or equal to 95% and lower than or equal to 100% and more preferably higher than or equal to 98% and lower than or equal to 100%.

In the above description, while step S12 and step S13 are performed in parallel, step S13 may be performed in parallel with step S14, or step S13 may be performed between step S12 and step S14. For example, a buffer tank may be placed in the communication passage 161, and the gas exhausted from the adsorption apparatus 11 in step S12 may be stored in the buffer tank. In this case, the sequence of steps S13 and 14 are arbitrarily interchangeable. It is preferable that in the case where such a buffer tank is provided, steps S13 and S14 may be performed in parallel.

The first enriched gas and the second enriched gas are mixed together as necessary (step S15). Of course, there is no need to mix the first enriched gas and the second enriched gas together.

The gas remaining in the space on the non-permeate side of the separation membrane after execution of step S13 is the gas from which the target gas has been removed by the separation membrane, i.e., a low-concentration gas reduced the concentration of the target gas. However, this gas contains the target gas to some extent. Thus, in order to more efficiency obtain the target gas, it is preferable that the gas remaining in the space on the non-permeate side may be returned through a passage 121*a* to the mixed-gas feeder 13 and used as part of the mixed gas. Although not shown, the gas remaining in the space on the non-permeate side is exhausted as appropriate through the exhaust passage 121 by using, for example, a pressure-reducing pump. The gas exhausted through the exhaust passage 121 may be collected in a tank.

The first enriched gas or the second enriched gas may be used as the replacement gas in step S12. Or, the enriched gas mixed in step S15 may be used as the replacement gas. The gas exhausted from the adsorption apparatus 11 in step S11 may be introduced into the space on the non-permeate side of the separation membrane apparatus 12. At this time, the gas exhausted from the adsorption apparatus 11 may be subjected to a process of separating a slight amount of target gas in the separation membrane apparatus 12, or may be exhausted from the exhaust passage 121 without going through that process.

As described above, the gas separation system 1 is capable of efficiently obtaining the target gas (in the form of an enriched gas) by obtaining the gas enriched with the target gas (second enriched gas) from the adsorption apparatus 11 and also obtaining the gas enriched with the target gas (first enriched gas) from the gas exhausted during gas replacement in the adsorption apparatus 11 by using the separation membrane apparatus 12. The gas separation system 1 is capable of not only improving the recovery rate of the target gas but also obtaining the enriched gas having a high concentration of the target gas.

Next, description is given of examples of experiment conducted assuming concrete development of the gas separation system 1 described above. For experiment, the gas separation system 1 without the aforementioned controller 17 was prepared. In actuality, the gas separation system 1 including two or more adsorption apparatuses 11 (see FIG. 7 described later) was prepared, and one of the adsorption apparatuses 11 was used. As the adsorbent, an X-type zeolite bead was used in the adsorption apparatus 11. As the separation membrane, a membrane complex composed of a porous alumina support and a Y-type zeolite membrane was used in the separation membrane apparatus 12.

The feed valve 133 of the mixed-gas feeder 13 was opened to feed a mixed gas with a $CO_2$ concentration of 10% and a $N_2$ (nitrogen) concentration of 90% to the adsorption apparatus 11 by using a blower. When the exhaust valve 164 was opened, a gas with a $CO_2$ concentration of 5% or less was obtained through the exhaust passage 163 as a result of $CO_2$ in the mixed gas being adsorbed by the adsorbent (step S11).

Before breakthrough of the adsorbent in the adsorption apparatus 11, the feed valve 133 was closed to stop the supply of the mixed gas. Thereafter, the feed valve 143 was opened to introduce a replacement gas with a $CO_2$ concentration of 98% or higher into the adsorption apparatus 11 under the pressure of atmospheric pressure or higher and to replace the gas inside the adsorption apparatus 11 (step S12). At this time, the exhaust gas exhausted from the adsorption apparatus 11 was introduced into the separation membrane apparatus 12, with the exhaust valve 164 closed, the communication valve 162 open, and the exhaust valve 122 closed. Then, the collection valve 124 was opened to reduce the pressure in the space on the permeate side of the separation membrane apparatus 12 to 10 kPa by the pressure-reducing pump 125 and thereby to collect a gas with a $CO_2$ concentration of 98% or higher as the first enriched gas (step S13).

After the completion of the gas replacement in the adsorption apparatus 11, the feed valve 143 was closed to stop the supply of the replacement gas, and the communication valve 162 was closed. Then, the exhaust valve 152 was opened to reduce the pressure in the adsorption apparatus 11 to 10 kPa by the pressure-reducing pump 153 and thereby to collect the second enriched gas with a $CO_2$ concentration of 98% or higher (step S14). After the completion of the gas collection, the operation of the pressure-reducing pump 153 was stopped, and the exhaust valve 152 was closed to seal up the adsorption apparatus 11. Moreover, after a certain amount of the first enriched gas was collected in the separation membrane apparatus 12 and the communication valve 162 was closed in step S13 described above, the exhaust valve 122 of the exhaust passage 121 connected to the space on the non-permeate side was opened to reduce the pressure by using a pressure-reducing pump (not shown) and thereby to exhaust a gas with a $CO_2$ concentration of 10% or lower. Thereafter, the operation of the pressure-reducing pump was stopped, and the exhaust valve 122 was closed to seal up the separation membrane apparatus 12.

Figure 6:
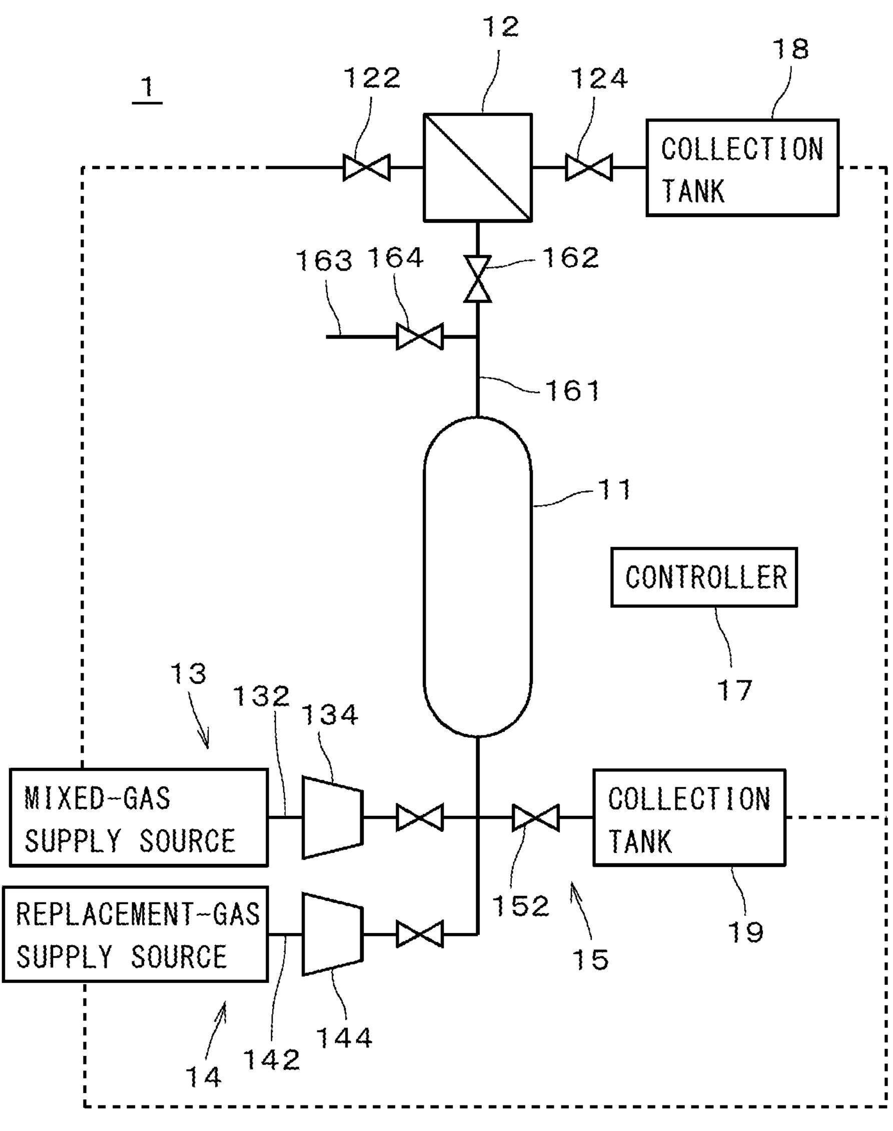
FIG. 6 is a diagram showing a variation of the gas separation system.

FIG. 6 is a diagram showing a variation of the gas separation system 1 shown in FIG. 1. In the gas separation system 1 shown in FIG. 1, the flow of gas is caused by a pressure difference between the pressure reduced by the pressure-reducing pumps 125 and 153 and the pressure close to normal atmospheric pressure. In the gas separation system 1 shown in FIG. 6, on the other hand, the pressure-reducing pumps 125 and 153 are omitted, and the flow of gas is caused by raising the pressure via compressors 134 and 144. The compressor 134 is placed in the feed passage 132 of the mixed-gas feeder 13, and the compressor 144 is placed in the feed passage 142 of the replacement-gas feeder 14.

In the gas separation system 1 shown in FIG. 6, when the mixed gas or the replacement gas is introduced into the adsorption apparatus 11, the pressure in the adsorption apparatus 11 is raised by the compressor 134 or 144, and this pressure in the adsorption apparatus 11 is used to exhaust the gas from the adsorption apparatus 11. With the exception of this point, the operations of the gas separation system 1 shown in FIG. 6 are the same as the operations of the gas separation system 1 shown in FIG. 1. The gas separation system 1 shown in FIG. 1 is used in the case where the adsorbent adsorbs or absorbs the target gas under normal atmospheric pressure and desorbs or dissipates the target gas under reduced pressure. Meanwhile, the gas separation system 1 shown in FIG. 6 is used in the case where the adsorbent adsorbs or absorbs the target gas under high pressure and desorbs or dissipates the target gas under normal atmospheric pressure.

To be more specific, a combination of an on-off valve and a pressure-regulating valve is used as the exhaust valve 164 in order to exhaust the gas in the adsorption apparatus 11 while maintaining high pressure in the adsorption apparatus 11 when the mixed gas or the replacement gas is introduced into the adsorption apparatus 11. As the exhaust valve 122 and the valves 152 and 124, a combination of an on-off valve and a pressure-regulating valve is also used in order to appropriately exhaust the gas from the adsorption apparatus 11. The communication valve 162 may also be a combination of an on-off valve and a pressure-regulating valve. Instead of these valves, any other type of valves or piping elements may be used.

Figure 7:
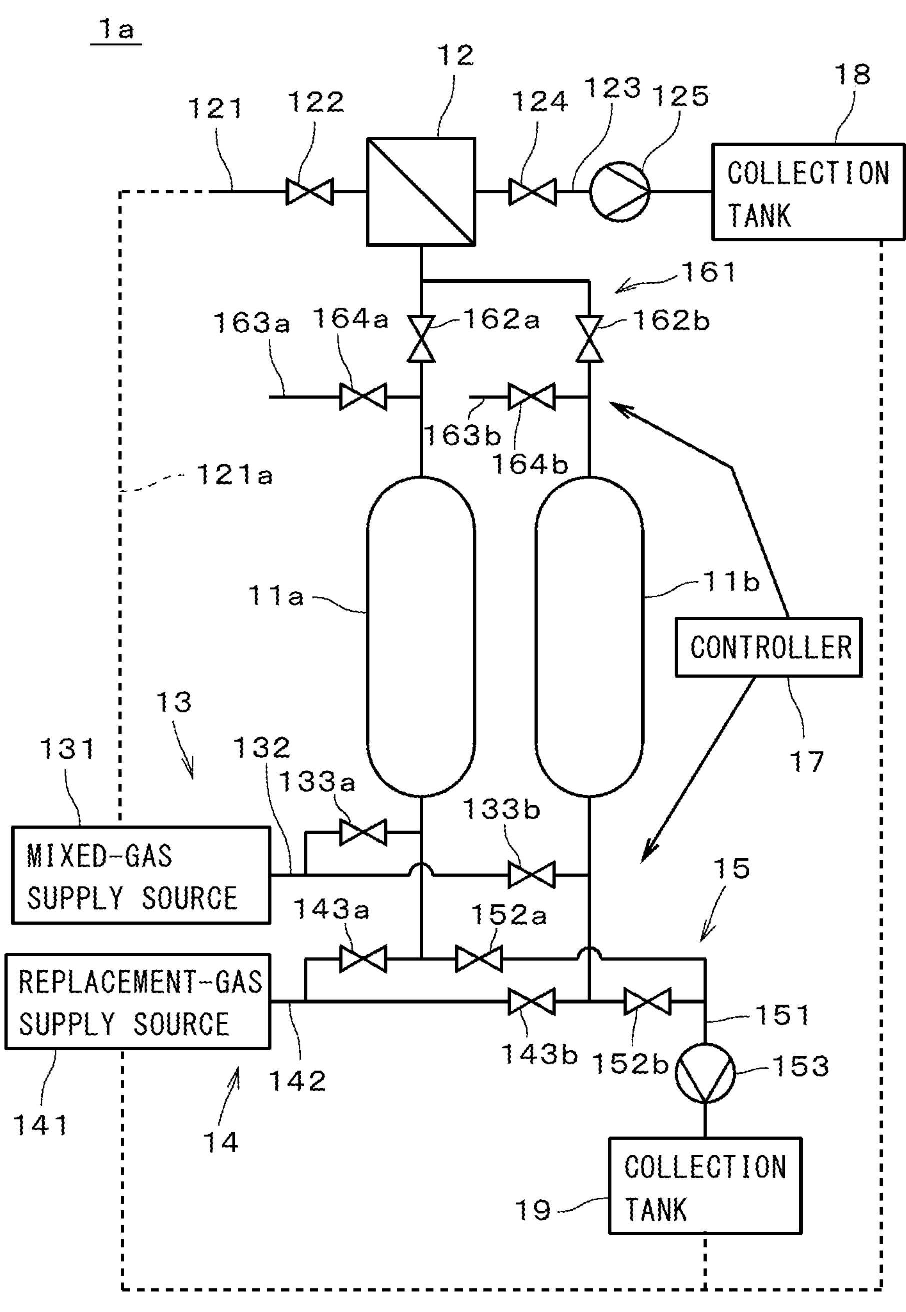
FIG. 7 is a diagram showing a gas separation system according to another example.

FIG. 7 is a diagram showing a gas separation system 1*a* according to another example. The gas separation system 1*a* includes two adsorption apparatuses 11*a* and 11*b*. The structures of the two adsorption apparatuses 11*a* and 11*b* are similar to the structure of the adsorption apparatus 11 shown in FIG. 1. When focusing on each adsorption apparatus, the operations performed in the gas separation system 1*a* are similar to the operations performed in the gas separation system 1 shown in FIG. 1. That is, the operations of the constituent elements such as the separation membrane apparatus 12 (and peripheral components therefor), the mixed-gas feeder 13, the replacement-gas feeder 14, the gas exhauster 15, and the other values are performed by turns for each of the adsorption apparatuses 11*a* and 11*b*. By performing operations related to the adsorption apparatus 11*a* and other operations related to the adsorption apparatus 11*b* in parallel, it is possible to continuously and efficiently obtain an enriched gas whose concentration of the target gas is higher than the concentration of the target gas in the mixed gas. In the following description of the gas separation system 1*a*, the description of the gas separation system 1 in FIG. 1 is quoted, with the exception that the two adsorption apparatuses 11*a* and 11*b* are provided.

To achieve the operations described above, the feed passage 132 of the mixed-gas feeder 13 branches off in two branch passages, one of which is connected to the adsorption apparatus 11*a* via a valve 133*a* and the other of which is connected to the adsorption apparatus 11*b* via a valve 133*b*. The feed passage 142 of the replacement-gas feeder 14 also branches off in two branch passages, one of which is connected to the adsorption apparatus 11*a* via a valve 143*a* and the other of which is connected to the adsorption apparatus 11*b* via a valve 143*b*.

In the exhaust passage 151 of the gas exhauster 15, a passage from the adsorption apparatus 11*a* is connected to the pressure-reducing pump 153 via a valve 152*a*, and a passage from the adsorption apparatus 11*b* is connected to the pressure-reducing pump 153 via a valve 152*b*. To be expressed more precisely, a partial passage from the adsorption apparatus 11*a* and a partial passage from the adsorption apparatus 11*b* merge together and is connected to the pressure-reducing pump 153. The valve 152*a* is placed in the partial passage from the adsorption apparatus 11*a*, and the valve 152*b* is placed in the partial passage from the adsorption apparatus 11*b*.

In the communication passage 161, a passage from the adsorption apparatus 11*a* is connected to the space on the non-permeate side of the separation membrane apparatus 12 via a communication valve 162*a*, and a passage from the adsorption apparatus 11*b* is connected to the space on the non-permeate side of the separation membrane apparatus 12 via a communication valve 162*b*. To be expressed more precisely, in the communication passage 161, a partial passage from the adsorption apparatus 11*a* and a partial passage from the adsorption apparatus 11*b* merge together and is connected to the separation membrane apparatus 12.

The communication valve 162*a* is placed in the partial passage from the adsorption apparatus 11*a*, and the communication valve 162*b* is placed in the partial passage from the adsorption apparatus 11*b*. The passage from the adsorption apparatus 11*a* is also connected to an exhaust passage 163*a* between the adsorption apparatus 11*a* and the communication valve 162*a*, and an exhaust valve 164*a* is placed in the exhaust passage 163*a*. The passage from the adsorption apparatus 11*b* is also connected to an exhaust passage 163*b* between the adsorption apparatus 11*b* and the communication valve 162*b*, and an exhaust valve 164*b* is placed in the exhaust passage 163*b*.

All of the valves given in the above description are on-off valves, and constituent elements in FIG. 7 given the same reference numbers as in FIG. 1 are the same as those shown in FIG. 1.

The aforementioned configuration allows the mixed-gas feeder 13 to introduce the mixed gas individually into the adsorption apparatuses 11*a* and 11*b*. The replacement-gas feeder 14 is allowed to introduce the replacement gas individually into the adsorption apparatuses 11*a* and 11*b*. The gas exhauster 15 is allowed to individually exhaust the gas inside the adsorption apparatuses 11*a* and 11*b*. The communication passage 161 is allowed to individually introduce the gases received from the adsorption apparatuses 11*a* and 11*b* into the space on the non-permeate side of the separation membrane apparatus 12 and to individually exhaust the gases received from the adsorption apparatuses 11*a* and 11*b*.

The controller 17 controls each constituent element described above. That is, the controller 17 controls, for example, the valves, the pressure-reducing pumps, and various types of supply sources included in the aforementioned constituent elements. In particular, the controller 17 controls the mixed-gas feeder 13, the replacement-gas feeder 14, the gas exhauster 15, and the communication valves 162*a* and 162*b*. The controller 17 also controls, for example, the exhaust valves 164*a* and 164*b* and peripheral components (including those not shown) for the adsorption apparatuses 11*a* and 11*b* and the separation membrane apparatus 12.

FIG. 8 is a flowchart showing the operations of the gas separation system 1*a*. In the normal operational state, continuous operations for repeating the operations shown in FIG. 8 are performed. FIGS. 9 to 12 are diagrams for describing the operations of the gas separation system 1*a*. The following description is given of the operations of the gas separation system 1*a* performed under the control of the controller 17.

Figure 9:
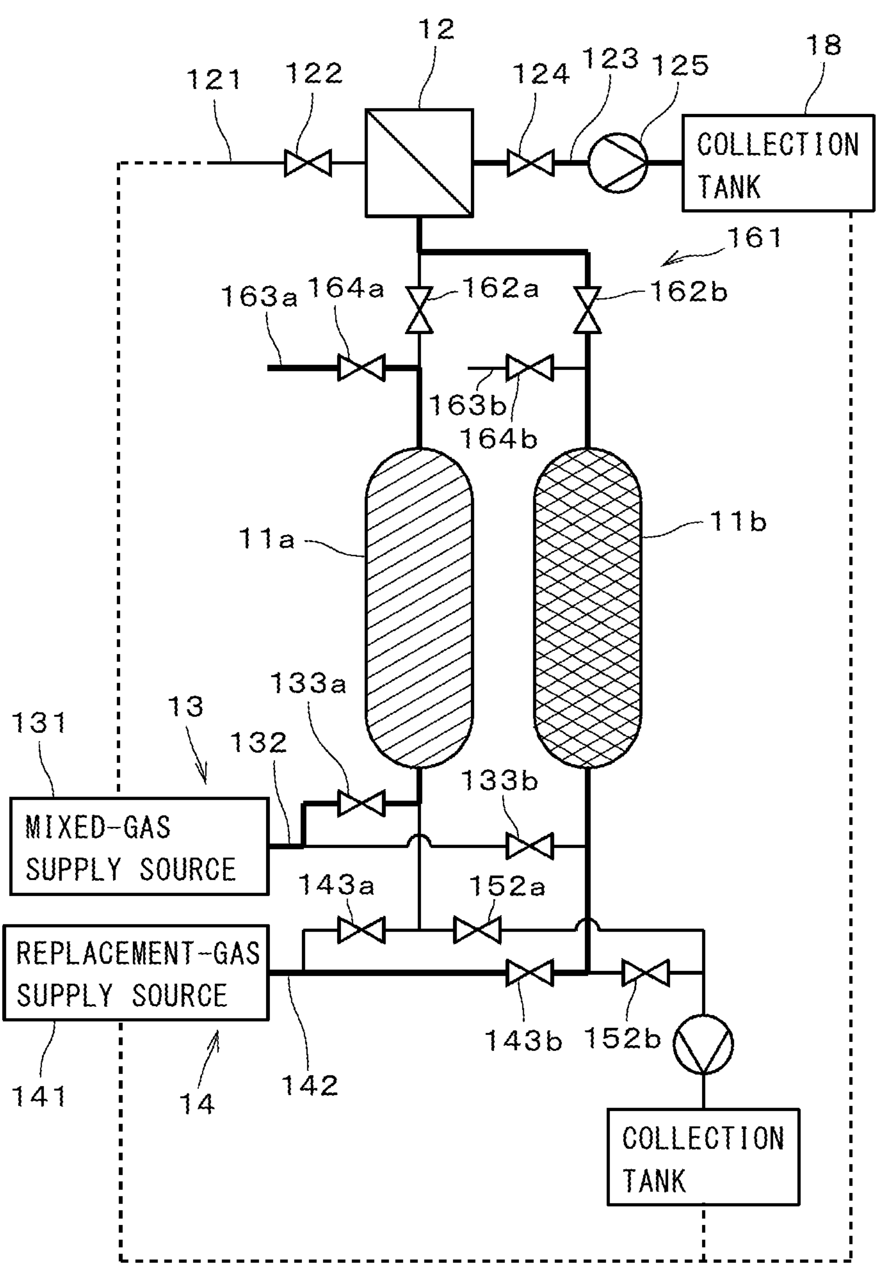
FIG. 9 is a diagram for describing the operations of the gas separation system.

First, as shown in FIG. 9, the mixed-gas feeder 13 introduces the mixed gas into the adsorption apparatus 11*a* (hereinafter, also referred to as the "first adsorption apparatus 11*a*") (step S11*a*). Specifically, in a state in which the pressure in the first adsorption apparatus 11*a* is reduced in advance and the valves 133*a*, 143*a*, 152*a*, 162*a*, and 164*a* around the first adsorption apparatus 11*a* are closed, the feed valve 133*a* is opened to introduce the mixed gas from the mixed-gas supply source 131 into the first adsorption apparatus 11*a* through the feed passage 132. Furthermore, the exhaust valve 164*a* is opened to further introduce the mixed gas from the mixed-gas supply source 131 into the first adsorption apparatus 11*a*. Accordingly, the target gas is adsorbed or absorbed by the adsorbent in the first adsorption apparatus 11*a*, and the gas that is not adsorbed or absorbed by the adsorbent is exhausted from the first adsorption apparatus 11*a* through the exhaust passage 163*a*. Note that the gas to be exhausted is not all of the gas that is not adsorbed or absorbed by the adsorbent. The exhaust gas may be collected for use in other applications. The supply of the mixed gas to the adsorption apparatus 11*a* is stopped before breakthrough of the adsorbent in the first adsorption apparatus 11*a*.

Meanwhile, at the time of start of step S11*a*, the introduction of the mixed gas into the adsorption apparatus 11*b* (hereinafter, also referred to as the "second adsorption apparatus 11*b*") is completed, and in parallel with step S11*a*, the replacement-gas feeder 14 introduces the replacement gas into the first adsorption apparatus 11*b* (step S12*b*). Specifically, in a state in which the valves 133*b*, 143*b*, 152*b*, 162*b*, and 164*b* are closed, the feed valve 143*b* is opened and furthermore the communication valve 162*b* is opened to introduce the replacement gas from the replacement-gas supply source 141 through the feed passage 142 into the second adsorption apparatus 11*b*. Accordingly, the interstices of the adsorbent are filled with the replacement gas.

In step S12*b*, part of the mixed gas and the replacement gas remaining in the interstices of the adsorbent in the second adsorption apparatus 11*b* is introduced through the communication passage 161 into the space on the non-permeate side of the separation membrane apparatus 12. The gas in the initial stage of step S12*b* may be exhausted through the exhaust passage 163*b* or the exhaust passage 121. That is, at least part of the gas exhausted from the second adsorption apparatus 11*b* is introduced into the space on the non-permeate side of the separation membrane.

Specifically, an initial volume of the gas exhausted from the second adsorption apparatus 11*b* is exhausted from the exhaust passage 163*b* and is not introduced into the space on the non-permeate side of the separation membrane. Alternatively, when the initial volume of the gas exhausted from the second adsorption apparatus 11*b* is introduced into the space on the non-permeate side, the collection valve 124 may be closed so as to prevent the gas from being separated by the separation membrane. This allows the separation membrane to efficiently separate the target gas from the gas exhausted from the second adsorption apparatus 11*b* during the gas replacement in the second adsorption apparatus 11*b*. Preferably, an average concentration of the target gas in the gas introduced into the separation membrane apparatus 12 may be higher than the concentration of the target gas in the mixed gas. This further improves the efficiency of obtaining the target gas by the separation membrane.

When the separation membrane apparatus 12 separates the gas, the valves 164*b* and 122 are closed, the collection valve 124 is opened, and the pressure-reducing pump 125 is driven, so that the first enriched gas enriched more with the target gas than the mixed gas by the separation membrane is obtained from the gas in the space on the non-permeate side (step S13*b*). The first enriched gas is stored in the collection tank 18. The concentration of the target gas in the first enriched gas may be preferably higher than or equal to 90% and lower than or equal to 100% and more preferably higher than or equal to 98% and lower than or equal to 100%. Note that the separation membrane apparatus 12 may separate the gas while keeping the valves 164*b* and 122 open and introducing the replacement gas into the second adsorption apparatus 11*b*. The above description of step S13*b* also applies to step S13*a* described below.

Figure 10:
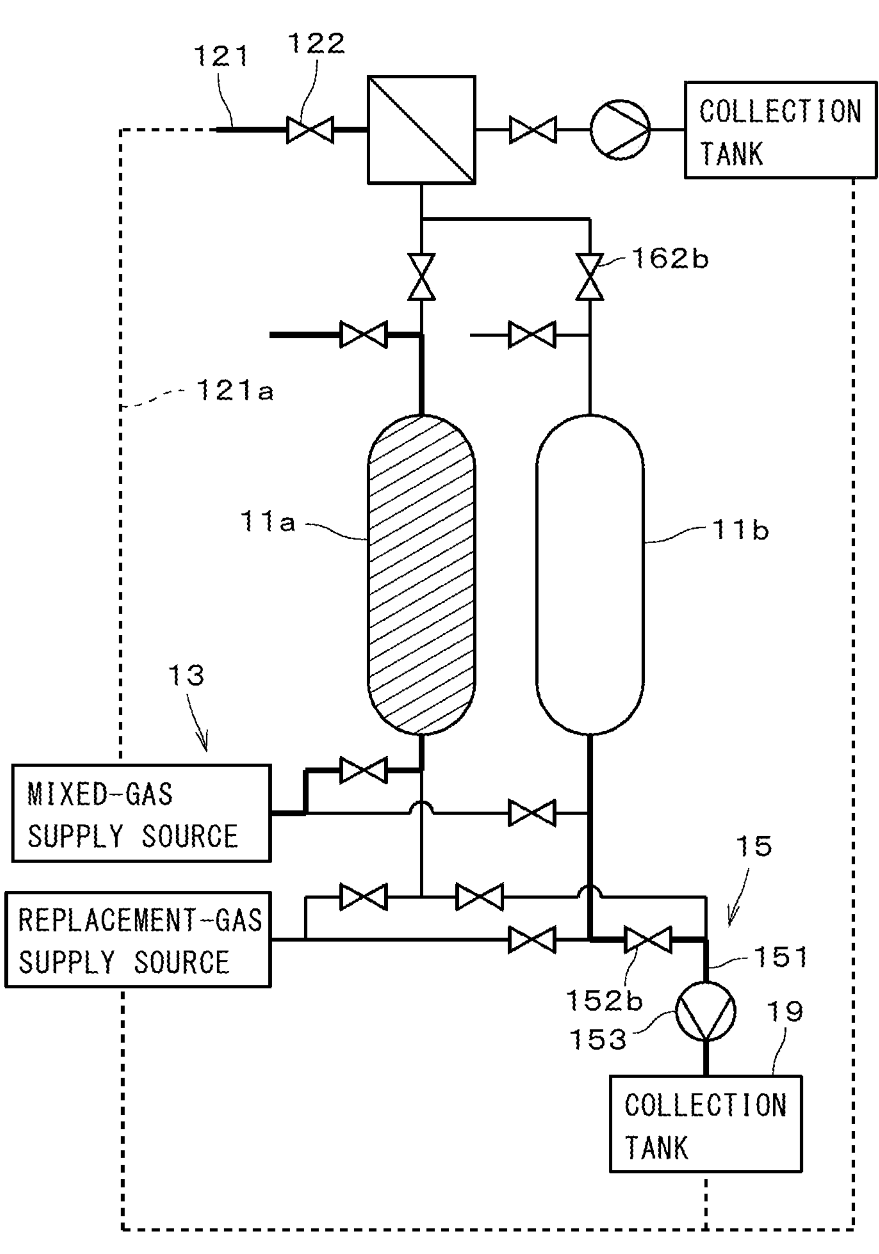
FIG. 10 is a diagram for describing the operations of the gas separation system.

Thereafter, as shown in FIG. 10, the feed valve 143*b* and the communication valve 162*b* are closed, the exhaust valve 152*b* is opened, and the pressure-reducing pump 153 is driven so as to exhaust the gas from the second adsorption apparatus 11*b* while desorbing or dissipating the target gas from the adsorbent. Accordingly, the second enriched gas enriched more with the target gas than the mixed gas is obtained (step S14*b*). The second enriched gas is stored in the collection tank 19. The concentration of the target gas in the second enriched gas may be preferably higher than or equal to 95% and lower than or equal to 100% and more preferably higher than or equal to 98% and lower than or equal to 100%.

In the above description, while step S12*b* and step S13*b* are performed in parallel, step S13*b* may be performed in parallel with step S14*b*, or step S13*b* may be performed between step S12*b* and step S14*b*. For example, a buffer tank may be placed in the communication passage 161, and the gas exhausted from the second adsorption apparatus 11*b* in step S12*b* may be stored in the buffer tank. In this case, the sequence of steps S13*b* and S14*b* is arbitrarily interchangeable. It is preferable that in the case where such a buffer tank is provided, steps S13*b* and S14*b* may be performed in parallel. The above description of steps S12*b* to S14*b* also applies to steps S12*a* to S14*a* described later.

In order to more efficiently obtain the target gas, it is preferable that the gas remaining in the space on the non-permeate side after execution of step S13*b* may be returned through the passage 121*a* to the mixed-gas feeder 13 and used as part of the mixed gas. Although not shown, the gas remaining in the space on the non-permeate side is exhausted as appropriate through the exhaust passage 121 by, for example, a pressure-reducing pump. The gas exhausted through the exhaust passage 121 may be collected in a tank.

Figure 11:
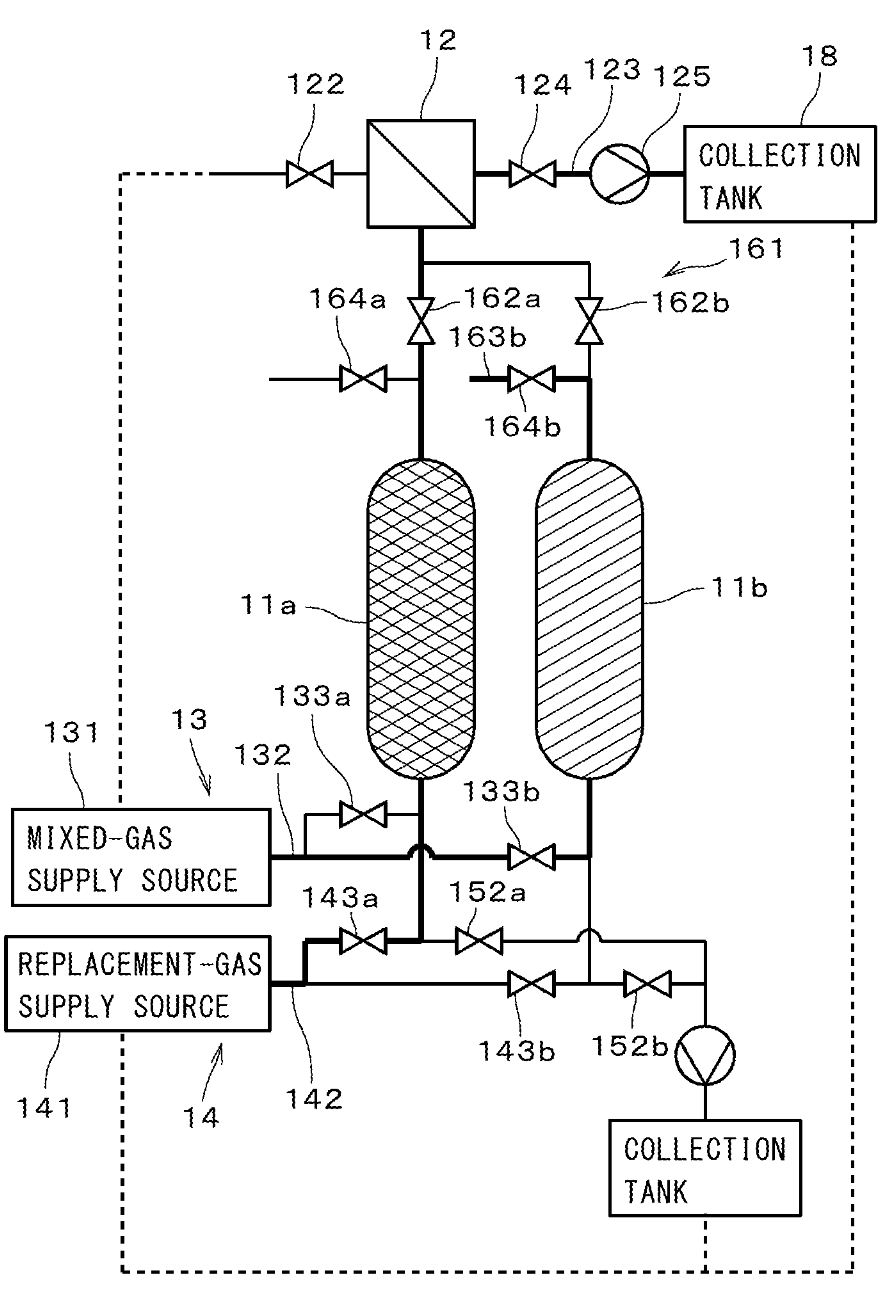
FIG. 11 is a diagram for describing the operations of the gas separation system.

When steps S12*b* to S14*b* have been executed during the execution of step S11*a*, then the mixed-gas feeder 13 introduces the mixed gas into the second adsorption apparatus 11*b* as shown in FIG. 11 (step S11*b*). Specifically, in a state in which the interior of the second adsorption apparatus 11*b* is in a pressure-reduced state and the valves 133*b*, 143*b*, 152*b*, 162*b*, and 164*b* around the second adsorption apparatus 11*b* are closed, the feed valve 133*b* is opened to introduce the mixed gas from the mixed-gas supply source 131 through the feed passage 132 into the second adsorption apparatus 11*b*. Furthermore, the exhaust valve 164*b* is opened to further introduce the mixed gas from the mixed-gas supply source 131 into the second adsorption apparatus 11*b*. Accordingly, the target gas is adsorbed or absorbed by the adsorbent in the second adsorption apparatus 11*b*, and the gas that is not adsorbed or absorbed by the adsorbent is exhausted from the second adsorption apparatus 11*b* through the exhaust passage 163*b*. Note that the gas to be exhausted is not all of the gas that is not adsorbed or absorbed by the adsorbent. The exhaust gas may be collected for use in other applications. The supply of the mixed gas to the second adsorption apparatus 11*b* is stopped before breakthrough of the adsorbent in the second adsorption apparatus 11*b*.

Meanwhile, at the time of start of step S11*b*, the introduction of the mixed gas into the first adsorption apparatus 11*a* is completed, and in parallel with step S11*b*, the replacement-gas feeder 14 introduces the replacement gas into the first adsorption apparatus 11*a* (step S12*a*). Specifically, in a state in which the valves 133*a*, 143*a*, 152*a*, 162*a*, and 164*a* are closed, the feed valve 143*a* is opened and furthermore the communication valve 162*a* is opened to introduce the replacement gas from the replacement-gas supply source 141 through the feed passage 142 into the first adsorption apparatus 11*a*. Accordingly, the interstices of the adsorbent are filled with the replacement gas. At this time, as in step S12*b*, at least part of the gas exhausted from the first adsorption apparatus 11*a* is introduced into the space on the non-permeate side of the separation membrane.

Figure 12:
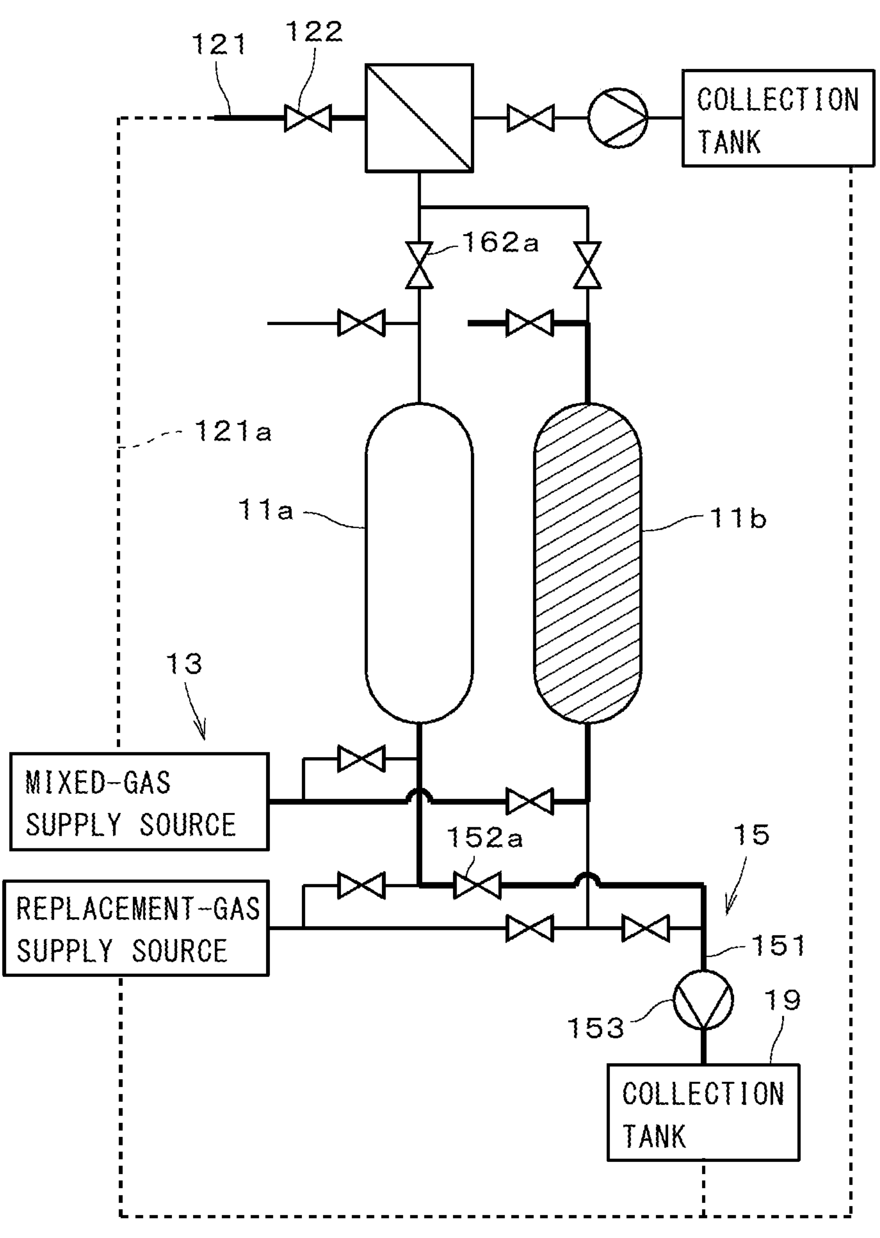
FIG. 12 is a diagram for describing the operations of the gas separation system.

Then, the valves 164*a* and 122 are closed, the collection valve 124 is opened, and the pressure-reducing pump 125 is driven, so that the first enriched gas enriched more with the target gas than the mixed gas by the separation membrane is obtained from the gas in the space on the non-permeate side (step S13*a*). The first enriched gas is stored in the collection tank 18. Note that the separation by the separation membrane may be performed while keeping the valves 164*a* and 122 open and introducing the replacement gas into the first adsorption apparatus 11*a*. As shown in FIG. 12, when the communication valve 162*a* is closed, the exhaust valve 152*a* is opened, and the pressure-reducing pump 153 is driven, the first adsorption apparatus 11*a* exhausts the gas while desorbing or dissipating the target gas from the adsorbent. Accordingly, the second enriched gas enriched more with the target gas than the mixed gas is obtained (step S14*a*). The second enriched gas is stored in the collection tank 19 through the exhaust passage 151.

In order to more efficiently obtain the target gas, it is preferable that the gas remaining in the space on the non-permeate side after execution of step S13*a* may be returned through the passage 121*a* to the mixed-gas feeder 13 and used as part of the mixed gas.

Thereafter, the processing returns to the execution of step S11*a*, and steps S12*b* to S14*b* are executed during step S11*a*. That is, in the gas separation system 1*a*, steps S12*b* to S14*b* are executed during execution of step S11*a*, and steps S12*a* to S14*a* are executed during execution of step S11*b*.

As in the case shown in FIG. 1, the first enriched gas and the second enriched gas may be mixed together as necessary. Moreover, the first or second enriched gas may be used as the replacement gas in step S12*a* or S12*b*. A mixture of the first enriched gas and the second enriched gas may be used as the replacement gas.

As described above, the gas separation system 1*a* is capable of efficiently obtaining the target gas (in the form of an enriched gas) by obtaining the gas (second enriched gas) enriched with the target gas from the adsorption apparatuses 11*a* and 11*b* and also obtaining the gas (first enriched gas) enriched with the target gas from the gas exhausted at the time of gas replacement in the adsorption apparatuses 11*a* and 11*b* by using the separation membrane apparatus 12. By using the two adsorption apparatuses 11*a* and 11*b*, it is possible to continuously obtain the first enriched gas and the second enriched gas.

Figure 13:
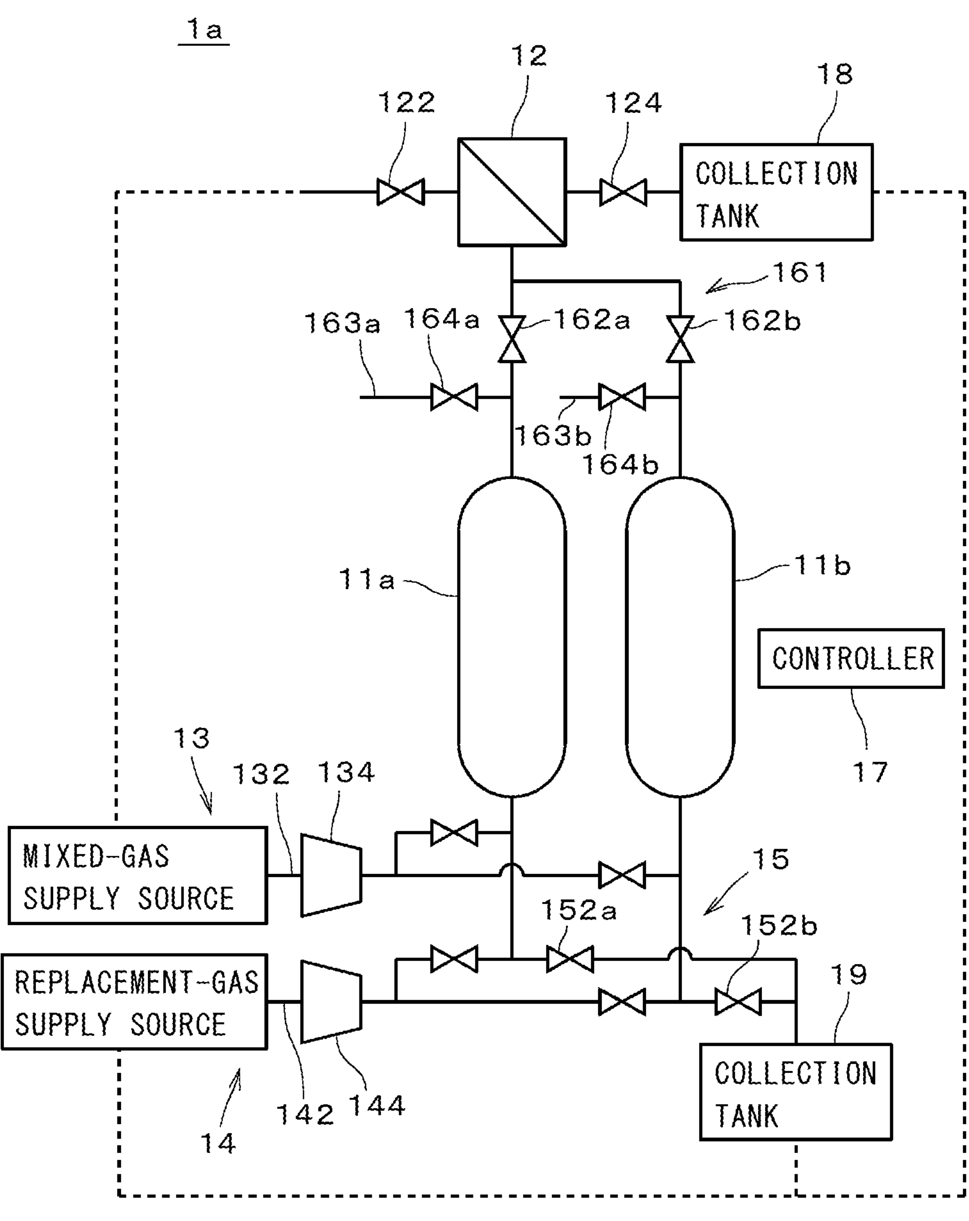
FIG. 13 is a diagram showing a variation of the gas separation system.

FIG. 13 is a diagram showing a variation of the gas separation system 1*a* shown in FIG. 7. The gas separation system 1*a* in FIG. 7 produces the flow of gas by a pressure difference between the pressure reduced by the pressure-reducing pumps 125 and 153 and the pressure close to normal atmospheric pressure. In the gas separation system 1*a* shown in FIG. 13, the pressure-reducing pumps 125 and 153 are omitted, and the flow of gas is produced by raising the pressure via the compressors 134 and 144. The compressor 134 is placed in the feed passage 132 of the mixed-gas feeder 13, and the compressor 144 is placed in the feed passage 142 of the replacement-gas feeder 14.

In the gas separation system 1*a* shown in FIG. 13, when the mixed gas or the replacement gas is introduced into the adsorption apparatus 11*a* or 11*b*, the pressure in the adsorption apparatus 11*a* or 11*b* is raised by the compressor 134 or 144, and this pressure in the adsorption apparatus 11*a* or 11*b* is used to exhaust the gas from the adsorption apparatus 11*a* or 11*b*. With the exception of this point, the operations of the gas separation system 1*a* shown in FIG. 13 are the same as the operations of the gas separation system 1*a* shown in FIG. 7. The gas separation system 1*a* shown in FIG. 7 is used in the case where the adsorbent adsorbs or absorbs the target gas under normal atmospheric pressure and desorbs or dissipates the target gas under reduced pressure. Meanwhile, the gas separation system 1*a* shown in FIG. 13 is used in the case where the adsorbent adsorbs or absorbs the target gas under high pressure and desorbs or dissipates the target gas under normal atmospheric pressure.

To be more specific, a combination of an on-off valve and a pressure-regulating valve is used as the exhaust valve 164*a* or 164*b* in order to exhaust the gas in the adsorption apparatus 11*a* or 11*b* while maintaining high pressure in the adsorption apparatus 11*a* or 11*b* when the mixed gas or the replacement gas is introduced into the adsorption apparatus 11*a* or 11*b*. As the exhaust valve 122 and the valves 152*a*, 152*b*, and 124, a combination of an on-off valve and a pressure-reducing valve is also used in order to appropriately exhaust the gas from the adsorption apparatus 11*a* or 11*b*. The communication valve 162*a* or 162*b* may also be a combination of an on-off valve and a pressure-regulating valve. Instead of these valves, any other type of valves or piping elements may be used.

The gas separation systems 1 and 1*a* are not intended to be limited to the examples described in the aforementioned embodiment, and may be modified in various ways.

The mixed gas according to the aforementioned embodiment may be any mixed gas of two or more types of gas. The target gas may also be any gas that contains two or more types of gas (except a very small amount of gas). In this case, the number of types of gas included in the mixed gas is greater than the number of types of gas included in the target gas. Preferably, the target gas may include two or less types of gas and, more preferably, the target gas may be one type of gas. In the case where the target gas includes two or more types of gas, the adsorbent in the adsorption apparatus 11 (including the adsorption apparatuses 11*a* and 11*b*; the same applies below) adsorbs or absorbs each of the plurality of gas included in the target gas. The separation membrane apparatus 12 also permeates and separates each of the plurality of types of gas included in the target gas. It is, however, noted that the separation membrane in the separation membrane apparatus 12 does not necessarily have to selectively permeate all of the gas which can be adsorbed or absorbed by the adsorption apparatus 11, and the separation membrane may pass only some of the gas which can be adsorbed or absorbed by the adsorption apparatus 11. That is, the separation membrane apparatus 12 may acquire a gas enriched with all of the types of gas to be adsorbed or absorbed by the adsorption apparatus 11 or may acquire a gas enriched with some of the types of gas, and the separation membrane apparatus 12 may pass only one type of gas.

The adsorption apparatus 11 may further include, in the internal space, an adsorbent that adsorbs or absorbs the target gas depending on temperature and desorbs or dissipates the target gas depending on temperature. The adsorption apparatus 11 may further include, in the internal space, an adsorbent that adsorbs or absorbs the target gas depending on pressure and temperature and desorbs or dissipates the target gas depending on pressure and temperature. The adsorbent in the adsorption apparatus 11 may further adsorb or absorb the target gas or desorb or dissipate the target gas depending on other factors such as a physical phenomenon or chemical phenomena. In this case, an apparatus that causes such a physical phenomenon or chemical phenomena may be placed in the adsorption apparatus 11 or in the vicinity of the adsorption apparatus 11.

The operations of the gas separation system 1 (including the gas separation system 1*a*; the same applies below) may preferably be automated by the controller 17, but may partly include operations made by operators. That is, the gas separation system 1 may be operated semi-automatically. Moreover, all of the operations of the gas separation system 1 may be executed by operations made by operators.

The gas separation system 1 may include both of pressure-reducing pumps and compressors. That is, the flow of gas may be produced by a pressure difference between the pressure reduced by the pressure-reducing pumps and the pressure increased by the compressors.

In the operations shown in FIG. 2, as described previously, step S13 (acquisition of the first enriched gas) may be performed in parallel with step S12 (introduction of the replacement gas), may be performed partly in parallel with step S12, or may be performed after step S12. Moreover, step S13 may be performed before step S14 (acquisition of the second enriched gas), may be performed in parallel with step S14, may be performed partly in parallel with step S14, or may be performed after step S14. Of course, in order to efficiently perform the operations, it is preferable that step S13 may be performed for a duration of time from the start of step S12 to the end of step S14.

In the operations shown in FIG. 8, the relationship of step S13*b* and steps S12*b* and S14*b* and the relationship of step S13*a* and steps S12*a* and S14*a* are the same as the aforementioned relationship of steps S12 to S14. Ordinarily, steps S11*a* and S11*b* are time-consuming processes. Thus, in order to efficiently perform the operations, steps S12*b* to S14*b* are executed during execution of step S11*a*, and steps S12*a* to S14*a* are executed during execution of step S11*b* in FIG. 8. However, if there is any other time-consuming process, processes that are executed in parallel may be changed as appropriate. For example, in the case where steps S14*a* and S14*b* are time-consuming processes, steps S11*b* to S13*b* may be executed during execution of step S14*a*, and steps S11*a* to S13*a* may be executed during execution of step S14*b*.

The number of adsorption apparatuses 11 is not limited to one or two. The number of adsorption apparatuses 11 in the aforementioned description indicates the unit of apparatuses that include the adsorbents to be used at the same time. For example, in the case where a plurality of adsorption towers are used at the same time, these adsorption towers correspond to one adsorption apparatus 11 according to the aforementioned embodiments. The number of adsorption apparatuses 11 may be three or more. Similarly, the number of separation membrane apparatuses 12 is also not limited to one and may be two or more. The number of separation membrane apparatuses 12 indicates the unit of apparatuses that include the separation membranes to be used at the same time. For example, even if there are a plurality of apparatuses that include a plurality of separation membranes, these apparatuses correspond to one separation membrane apparatus 12 (i.e., these apparatuses are counted as one separation membrane apparatus 12) when they are used at the same time. Preferably, the number of separation membrane apparatuses 12 may be less than the number of adsorption apparatuses 11. If the separation membrane apparatuses 12 are provided by the number equivalent to the number of adsorption apparatuses 11 that have overlapping gas exhaustion times, the gas exhausted from any of the adsorption apparatuses 11 can be introduced into any of the separation membrane apparatuses 12 even if the number of adsorption apparatuses 11 is greater than the number of separation membrane apparatuses 12. This improves the efficiency of obtaining the enriched gas. For example, another preferable embodiment is such that the number of adsorption apparatuses 11 is three and the number of separation membrane apparatuses 12 is one.

The positions at which the mixed-gas feeder 13, the replacement-gas feeder 14, the gas exhauster 15, and the communication passage 161 are connected to the adsorption apparatus 11 may be appropriately changed. For example, the gas exhauster 15 may be connected to the communication passage 161.

In order to suppress a reduction in the concentration of the target gas in the second enriched gas, it is preferable that the concentration of the target gas in the replacement gas is higher than or equal to the concentration of the target gas in the second enriched gas.

In the case of the example shown in FIG. 1, the mixed gas is introduced into the adsorption apparatus 11 whose internal space is under a pressure less than atmospheric pressure, and when the pressure in the internal space has become atmospheric pressure, the exhaust valve 164 is opened to exhaust the gas and fill the internal space with the mixed gas. Accordingly, the introduction of the mixed gas by the mixed-gas feeder 13 is performed under atmospheric pressure or a pressure slightly higher than the atmospheric pressure. Subsequent introduction of the replacement gas is also performed under atmospheric pressure or a pressure slightly higher than the atmospheric pressure. Meanwhile, in the case of the example shown in FIG. 6, the mixed gas and the replacement gas are introduced into the adsorption apparatus 11 by the compressors 134 and 144 under a pressure higher than the atmospheric pressure. Therefore, the mixed gas and the replacement gas are introduced into the adsorption apparatus 11 under a pressure higher than or equal to the atmospheric pressure.

In the case of the example shown in FIG. 1, the replacement gas is exhausted from the adsorption apparatus 11 by the pressure-reducing pump 153 under a pressure less than the atmospheric pressure. Preferably, the pressure in the internal space of the adsorption apparatus 11 may be reduced to 30 kPa or less by the pressure-reducing pump 153. In the case of the example shown in FIG. 6, it is possible to exhaust the replacement gas by simply opening the exhaust valve 152 of the gas exhauster 15 because the internal space of the adsorption apparatus 11 is in a compressed state. Accordingly, the gas exhauster 15 may preferably exhaust the gas from the adsorption apparatus 11 under a pressure less than or equal to the atmospheric pressure.

As described previously, the gas separation system 1 (1*a*) described in the aforementioned embodiments is illustrative only, and other constituent elements may be disposed in various places and the arrangement of each constituent element may also be changed appropriately.

The constitutions of the above-described preferred embodiment and the variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1, 1*a* gas separation system
11, 11*a*, 11*b* adsorption apparatus
12 separation membrane apparatus
13 mixed-gas feeder
14 replacement-gas feeder
15 gas exhauster
17 controller
121*a* passage
161 communication passage
162, 162*a*, 162*b* communication valve
S11 to S15, S11*a* to S14*a*, S11*b* to S14*b* step

The invention claimed is:

1. A gas separation system for obtaining a gas enriched with a target gas from a mixed gas including said target gas, the gas separation system comprising:

an adsorption apparatus that includes an adsorbent in an internal space, said adsorbent adsorbing or absorbing a target gas;

a separation membrane apparatus that includes a separation membrane that permeates said target gas, said separation membrane apparatus flowing said target gas out of a gas introduced into a space on a non-permeate side of said separation membrane to a space on a permeate side of said separation membrane;

a mixed-gas feeder that introduces a mixed gas into said adsorption apparatus, said mixed gas including said target gas;

a replacement-gas feeder that introduces a replacement gas into said adsorption apparatus, said replacement gas having a higher concentration of said target gas than said mixed gas;

a gas exhauster that exhausts a gas in said adsorption apparatus;

a communication passage that includes a passage for guiding a gas in said adsorption apparatus to the space on said non-permeate side of said separation membrane, said communication passage further including a valve placed in said passage; and a controller, wherein said controller controls said mixed-gas feeder, said replacement-gas feeder, said gas exhauster, and said valve to execute:

a) introducing said mixed gas into said adsorption apparatus, causing said adsorbent to adsorb or absorb said target gas, and exhausting a gas that is not adsorbed or absorbed by said adsorbent from said adsorption apparatus;

b) after said operation a), introducing said replacement gas into said adsorption apparatus;

c) introducing at least part of the gas exhausted from said adsorption apparatus in said operation b) into the space on said non-permeate side of said separation membrane and obtaining a gas enriched more with said target gas than said mixed gas by said separation membrane from a gas in the space on said non-permeate side; and d) after said operation b), obtaining a gas enriched more with said target gas than said mixed gas by exhausting a gas from said adsorption apparatus while causing said adsorbent to desorb or dissipate said target gas.

2. The gas separation system according to claim 1, wherein in said operation c), an initial volume of the gas exhausted from said adsorption apparatus is not introduced into the space on said non-permeate side of said separation membrane, or when the initial volume of the gas exhausted from said adsorption apparatus is introduced into the space on said non-permeate side, gas separation by said separation membrane is not executed.

3. The gas separation system according to claim 1, further comprising:

a passage for guiding a gas in the space on said non-permeate side of said separation membrane to said mixed-gas feeder for use as part of said mixed gas.

4. The gas separation system according to claim 1, further comprising:

another adsorption apparatus similar to said adsorption apparatus, wherein said communication passage includes a passage for guiding a gas in said another adsorption apparatus to the space on said non-permeate side of said separation membrane, said communication passage further including another valve placed in said passage, and said controller controls said mixed-gas feeder, said replacement-gas feeder, said gas exhauster, said valve, and said another valve to execute:

e) introducing said mixed gas into said another adsorption apparatus;

f) after said operation e), introducing said replacement gas into said another adsorption apparatus;

g) introducing at least part of a gas exhausted from said another adsorption apparatus in said operation f) into the space on said non-permeate side of said separation membrane and obtaining a gas enriched more with said target gas than said mixed gas by said separation membrane from a gas in the space on said non-permeate side; and h) after said operation f), obtaining a gas enriched more with said target gas than said mixed gas by exhausting a gas from said another adsorption apparatus while causing an adsorbent in said another adsorption apparatus to desorb or dissipate said target gas, said operations f) to h) being executed during execution of said operation a), and said operations b) to d) being executed during execution of said operation e).

5. The gas separation system according to claim 1, wherein said target gas is a carbon dioxide gas.

6. The gas separation system according to claim 1, wherein said replacement gas has a concentration of said target gas higher than or equal to 98%.

7. A gas separation method of obtaining a gas enriched with a target gas from a mixed gas including said target gas, the gas separation method comprising:

a) introducing a mixed gas including a target gas into an adsorption apparatus that includes an adsorbent in an internal space, causing said adsorbent to adsorb or absorb said target gas, and exhausting a gas that is not adsorbed or absorbed by said adsorbent from said adsorption apparatus;

b) after said operation a), introducing a replacement gas into said adsorption apparatus, said replacement gas having a higher concentration of said target gas than said mixed gas;

c) introducing at least part of the gas exhausted from said adsorption apparatus in said operation b) into a space on a non-permeate side of a separation membrane apparatus that includes a separation membrane that permeates said target gas, and obtaining a gas enriched more with said target gas than said mixed gas by said separation membrane from a gas in the space on said non-permeate side; and d) after said operation b), obtaining a gas enriched more with said target gas than said mixed gas by exhausting a gas from said adsorption apparatus while causing said adsorbent to desorb or dissipate said target gas.

8. The gas separation method according to claim 7, wherein in said operation c), an initial volume of the gas exhausted from said adsorption apparatus is not introduced into the space on said non-permeate side of said separation membrane, or when the initial volume of the gas exhausted from said adsorption apparatus is introduced into the space on said non-permeate side, gas separation by said separation membrane is not executed.

9. The gas separation method according to claim 7, wherein an average concentration of said target gas in the gas introduced into said separation membrane apparatus in said operation c) is higher than a concentration of said target gas in said mixed gas.

10. The gas separation method according to claim 7, wherein the gas obtained in the space on said non-permeate side of said separation membrane in said operation c) is used as part of said mixed gas.

11. The gas separation method according to claim 7, further comprising:

e) introducing said mixed gas into another adsorption apparatus that is similar to said adsorption apparatus;

f) after said operation e), introducing said replacement gas into said another adsorption apparatus;

g) introducing at least part of a gas exhausted from said another adsorption apparatus in said operation f) into the space on said non-permeate side of said separation membrane apparatus and obtaining a gas enriched more with said target gas than said mixed gas by said separation membrane from the gas in the space on said non-permeate side; and h) after said operation f), obtaining a gas enriched more with said target gas than said mixed gas by exhausting a gas from said another adsorption apparatus while causing an adsorbent in said another adsorption apparatus to desorb or dissipate said target gas, wherein said operations f) to h) are executed during execution of said operation a), and said operations b) to d) are executed during execution of said operation e).

12. The gas separation method according to claim 7, wherein said target gas is a carbon dioxide gas.

13. The gas separation method according to claim 7, wherein said replacement gas has a concentration of said target gas higher than or equal to 98%.

14. The gas separation method according to claim 7, further comprising:

mixing the gas enriched with said target gas in said operation c) with the gas enriched with said target gas in said operation d).

15. The gas separation method according to claim 7, wherein said replacement gas in said operation b) is either the gas enriched with said target gas in said operation c) or the gas enriched with said target gas in said operation d).

* * * * *